US012302305B2

(12) United States Patent
Taherzadeh Boroujeni et al.

(10) Patent No.: US 12,302,305 B2
(45) Date of Patent: *May 13, 2025

(54) USING BEAM FAILURE SIMILARITY FOR BEAM FAILURE RECOVERY

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,917

(22) Filed: Jul. 16, 2021

(65) Prior Publication Data

US 2023/0015229 A1  Jan. 19, 2023

(51) Int. Cl.
*H04W 72/044*  (2023.01)
*H04W 74/04*  (2009.01)

(52) U.S. Cl.
CPC ......... *H04W 72/046* (2013.01); *H04W 74/04* (2013.01)

(58) Field of Classification Search
CPC ............................ H04W 72/046; H04W 74/04
See application file for complete search history.

(56) References Cited

U.S. PATENT DOCUMENTS

| | | | |
|---|---|---|---|
| 11,658,728 B2 | 5/2023 | Taherzadeh Boroujeni | |
| 2019/0053314 A1* | 2/2019 | Zhou | H04B 7/0695 |
| 2019/0379440 A1* | 12/2019 | Wong | H04W 72/046 |
| 2020/0068416 A1* | 2/2020 | Kang | H04W 74/0833 |
| 2020/0228185 A1* | 7/2020 | Tao | H04B 7/088 |
| 2020/0266942 A1 | 8/2020 | Akkarakaran et al. | |
| 2021/0036752 A1* | 2/2021 | Tofighbakhsh | H04B 17/12 |
| 2021/0049628 A1 | 2/2021 | Baird | |
| 2022/0045736 A1* | 2/2022 | Hu | H04W 72/54 |
| 2022/0210806 A1* | 6/2022 | Rastegardoost | H04L 5/0051 |
| 2022/0360306 A1* | 11/2022 | Sun | H04W 72/23 |
| 2023/0019819 A1* | 1/2023 | Taherzadeh Boroujeni | H04W 16/28 |
| 2024/0032010 A1 | 1/2024 | Taherzadeh Boroujeni et al. | |

FOREIGN PATENT DOCUMENTS

WO  WO-2019032882 A1 *  2/2019  ........... H04B 7/0695

OTHER PUBLICATIONS

International Search Report and Written Opinion—PCT/US2022/072953—ISA/EPO—dated Sep. 30, 2022.

\* cited by examiner

*Primary Examiner* — Phirin Sam
*Assistant Examiner* — David Zhijun Sun
(74) *Attorney, Agent, or Firm* — Harrity & Harrity, LLP/QUALCOMM Incorporated

(57) ABSTRACT

Various aspects of the present disclosure generally relate to wireless communication. In some aspects, a user equipment (UE) may detect a beam failure event associated with the UE. The UE may detect a first condition of the UE. The UE may perform one or more actions associated with beam failure recovery based at least in part on a measure of similarity between the first condition of the UE and a second condition of the UE associated with a past beam failure event. Numerous other aspects are described.

31 Claims, 17 Drawing Sheets

USING BEAM FAILURE SIMILARITY FOR BEAM FAILURE RECOVERY

Aspects of the present disclosure generally relate to wireless communication and to techniques and apparatuses for beam failure recovery.

Wireless communication systems are widely deployed to provide various telecommunication services such as telephony, video, data, messaging, and broadcasts. Wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include detecting a beam failure event associated with the UE. The method may include detecting a first condition of the UE. The method may include performing one or more actions associated with beam failure recovery based at least in part on a measure of similarity between the first condition of the UE and a second condition of the UE associated with a past beam failure event.

Some aspects described herein relate to a method of wireless communication performed by a base station. The method may include receiving, from a UE, a beam failure similarity (BFS) report, the BFS report indicating a measure of similarity between a first condition of the UE and a second condition of the UE associated with a past beam failure event. The method may include transmitting, to the UE, configuration information indicating one or more actions to be performed by the UE when a third condition of the UE is similar to the second condition.

Some aspects described herein relate to a device for wireless communication. The device may include a memory and one or more processors coupled to the memory. The memory and the one or more processors may be configured to detect a beam failure event associated with the device. The memory and the one or more processors may be configured to detect a first condition of the device. The memory and the one or more processors may be configured to perform one or more actions associated with beam failure recovery based at least in part on a measure of similarity between the first condition of the device and a second condition of the device associated with a past beam failure event.

Some aspects described herein relate to a device for wireless communication. The device may include a memory and one or more processors coupled to the memory. The memory and the one or more processors may be configured to receive, from a user equipment (UE), a beam failure similarity (BFS) report. The memory and the one or more processors may be configured to the BFS report indicating a measure of similarity between a first condition of the UE and a second condition of the UE associated with a past beam failure event. The memory and the one or more processors may be configured to transmit, to the UE, configuration information indicating one or more actions to be performed by the UE based at least in part on a third condition of the UE being similar to the second condition.

Some aspects described herein relate to a non-transitory computer-readable medium that stores a set of instructions for wireless communication by a user equipment (UE). The set of instructions, when executed by one or more processors of the UE, may cause the UE to detect a beam failure event associated with the UE. The set of instructions, when executed by one or more processors of the UE, may cause the UE to detect a first condition of the UE. The set of instructions, when executed by one or more processors of the UE, may cause the UE to perform one or more actions associated with beam failure recovery based at least in part on a measure of similarity between the first condition of the UE and a second condition of the UE associated with a past beam failure event.

Some aspects described herein relate to a non-transitory computer-readable medium that stores a set of instructions for wireless communication by a base station. The set of instructions, when executed by one or more processors of the base station, may cause the base station to receive, from a user equipment (UE), a beam failure similarity (BFS) report. The set of instructions, when executed by one or more processors of the base station, may cause the base station to transmit, to the UE, configuration information indicating one or more actions to be performed by the UE based at least in part on a third condition of the UE being similar to the second condition.

Some aspects described herein relate to an apparatus for wireless communication. The apparatus may include means for detecting a beam failure event associated with the UE. The apparatus may include means for detecting a first condition of the UE. The apparatus may include means for performing one or more actions associated with beam failure recovery based at least in part on a measure of similarity between the first condition of the UE and a second condition of the UE associated with a past beam failure event.

Some aspects described herein relate to an apparatus for wireless communication. The apparatus may include means for receiving, from a user equipment (UE), a beam failure similarity (BFS) report, the BFS report indicating a measure of similarity between a first condition of the UE and a second condition of the UE associated with a past beam failure event. The apparatus may include means for transmitting, to the UE, configuration information indicating one or more actions to be performed by the UE based at least in part on a third condition of the UE being similar to the second condition.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
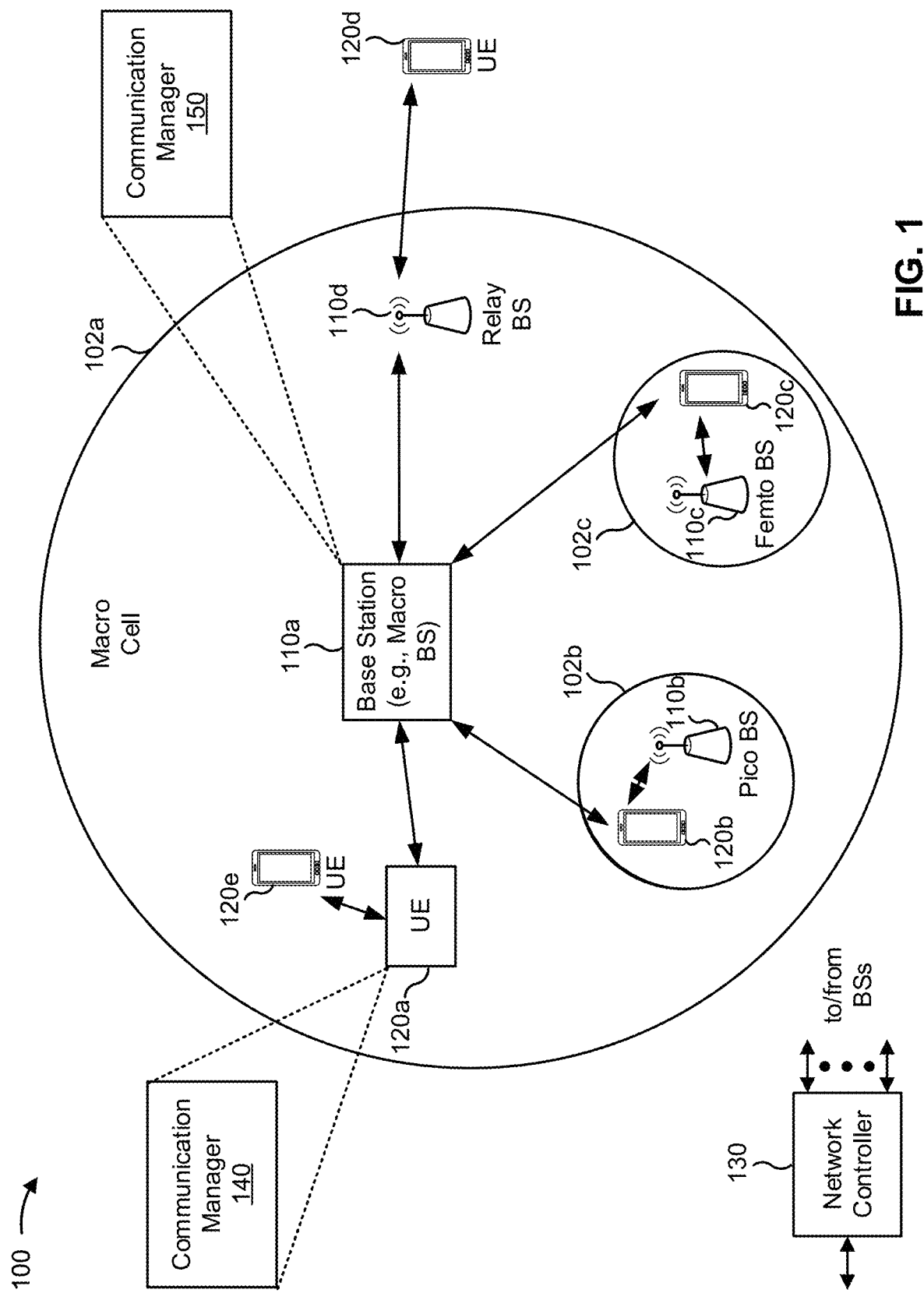
FIG. 1 is a diagram illustrating an example of a wireless network, in accordance with the present disclosure.

Reference signals transmitted by a base station to a UE may enable the UE to perform beam failure detection and recovery procedures. For example, and as described further herein, the UE may measure a characteristic of a reference signal and compare the measured characteristic to a threshold to detect beam failure. Recovering from beam failure may include the use of random access channel (RACH) procedures. For example, and as described further herein, as part of RACH, the UE may measure signal characteristics of multiple candidate beams to identify a new beam for recovery, identify resources for communicating with a base station using the new beam, and establish communications with the base station using the new beam. However, the beam failure detection and recovery procedures use UE power and communication resources in recovering from beam failure, such as resources for performing a RACH procedure, beam sweeping, additional reporting, and/or the like. In addition, beam failure recovery, including RACH, takes time to perform, during which the UE may experience degraded communications capabilities, such as increased latency, decreased throughput, and/or the like. While a Layer 1 (L1) report (e.g., a physical layer report that may be used to provide the base station with information that facilitates communications between the base station and the UE, such as a report indicating signal-to-interference-plus-noise ratio (SINR), reference signal received power (RSRP), and/or the like) may provide the base station with an indication of signal quality, the nature of an L1 report is designed to carry a limited amount of information in an effort to conserve resources, given the relatively high frequency at which the L1 reports are transmitted. While other types of reporting, such as Layer 3 (L3) (e.g., RRC layer) reporting of UE measurements, minimization of drive test (MDT) reporting, and/or the like, are capable of carrying more information than some L1 reports, L3 reports may be transmitted less frequently than L3 reports, and L1 reports may be more frequently transmitted (e.g., by the UE) and processed (e.g., by the UE and base station), which may enable some time sensitive and/or resource limited applications, such as beam failure recovery.

Some techniques and apparatuses described herein enable a UE to detect a beam failure event (e.g., a beam failure instance and/or a beam failure recovery event, as described herein) associated with the UE and detect a first condition of the UE. A UE's condition may include a set of measurable properties that define a condition and/or state of the UE. The set of measurable properties may include, for example, information identifying the UE's location, a time associated with detecting the UE's condition, one or more UE signal measurements (e.g., RSRP, SINR, received signal strength indicator (RSSI) values, and/or the like) for one or more base stations and/or TRPs, among other examples. Based at least in part on a measure of similarity between the first condition of the UE and a second condition (e.g., a previous location, a previous time, a previous signal measurement, and/or the like) of the UE associated with a past beam failure event, the UE may perform one or more actions (e.g., actions designed to address the beam failure event). In some aspects, the measure of similarity may be included in information associated with an L1 report, as described herein. The one or more actions may include, in some aspects, continuing to use a current beam for communications with a base station, performing contention-free RACH with the base station, or performing contention-free RACH with a transmit receive point (TRP) separate from the base station. Using similarity of current UE conditions to past beam failure events may enable the UE and/or the base station to take one or more actions designed to address a potential beam failure, either before it occurs or after the beam failure. Using information regarding past beam failure events to make informed decisions in addressing a beam failure event may reduce the resources (e.g., time, processing, and/or communication resources, among other examples) used in determining how to handle the beam failure event. For example, rather than triggering a beam failure recovery process (e.g., RACH) that would use UE and base station resources to attempt to find a new beam for communications, the UE may opt to continue using a current beam for communications with the base station and forego the beam failure recovery process. In addition, using information regarding past beam failure events may reduce the resources (e.g., time, processing, and/or communication resources, among other examples) used to handle recovery from the beam failure event. For example, in a situation where a beam failure recovery process (e.g., RACH) is to be performed, the UE may use information regarding prior RACH procedures (e.g., RACH configuration information, one or more parameters for transmitting a random access message (RAM), one or more parameters for receiving a random access response (RAR) to the RAM, one or more parameters of an RAR message, among other examples) to more efficiently perform RACH with the base station or another TRP.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, configuration information specifying similarity data to be provided in an L1 report; and transmit, to the base station and based at least in part on receiving the configuration information, the L1 report, the L1 report indicating a measure of similarity between a current condition of the UE and a past condition of the UE associated with a past event associated with the UE. Additionally, or alternatively, the communication manager 140 may perform one or more other operations described herein.

In some aspects, the base station 110 may include a communication manager 150. As described in more detail elsewhere herein, the communication manager 150 may transmit, to a UE, configuration information specifying similarity data to be provided in an L1 report; and receive, from the UE and based at least in part on transmitting the configuration information, the L1 report, the L1 report indicating a measure of similarity between a current condition of the UE and a past condition of the UE associated with a past event associated with the UE. Additionally, or alternatively, the communication manager 150 may perform one or more other operations described herein.

As indicated above, FIG. 1 is provided as an example. Other examples may differ from what is described with regard to FIG. 1.

Figure 2:
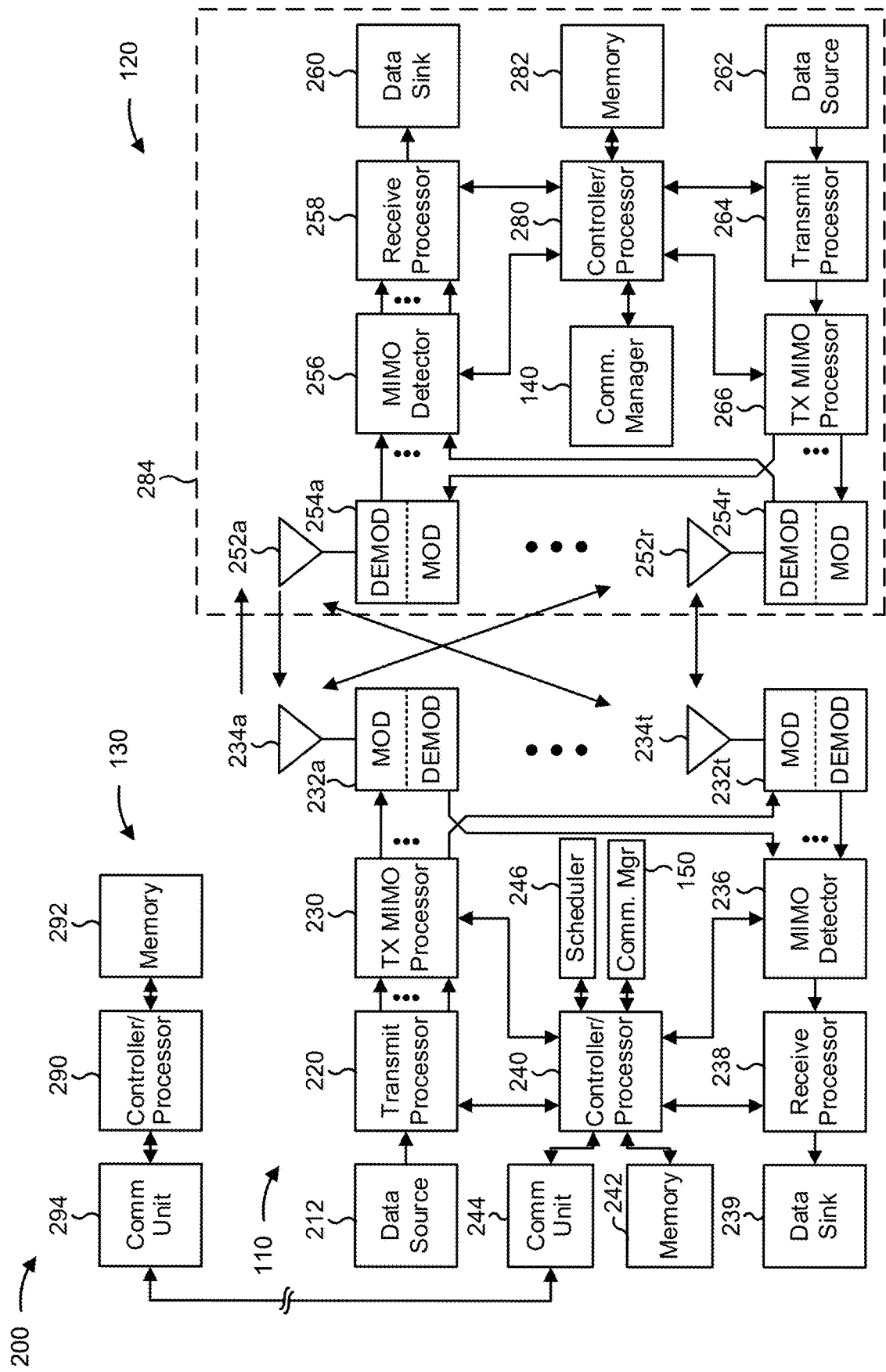
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with beam failure recovery, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for detecting a beam failure event associated with the UE; means for detecting a first condition of the UE; and/or means for performing one or more actions associated with beam failure recovery based at least in part on a measure of similarity between the first condition of the UE and a second condition of the UE associated with a past beam failure event. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a UE, a beam failure similarity (BFS) report, the BFS report indicating a measure of similarity between a first condition of the UE and a second condition of the UE associated with a past beam failure event; and/or means for transmitting, to the UE, configuration information indicating one or more actions to be performed by the UE when a third condition of the UE is similar to the second condition. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
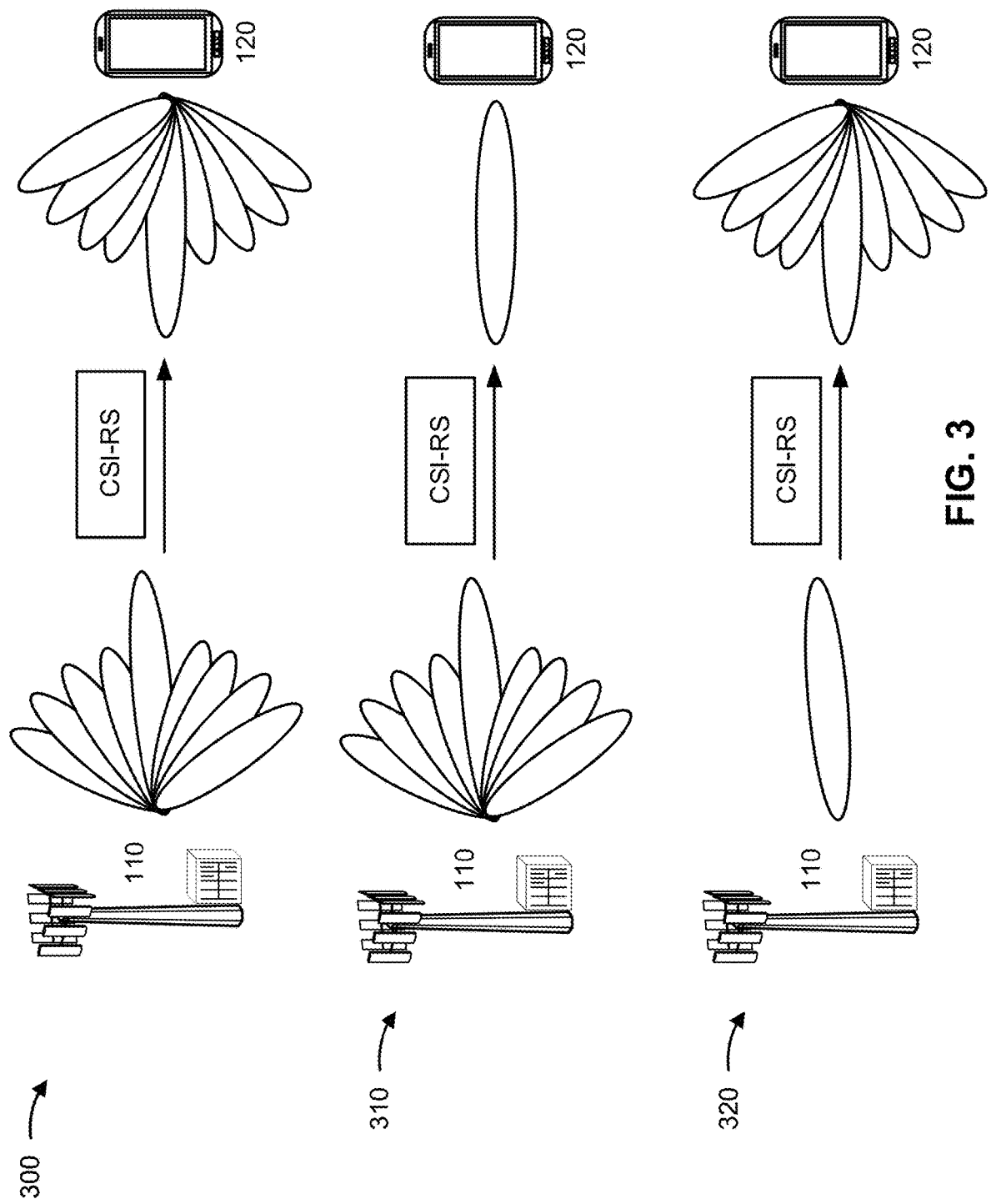
FIG. 3 is a diagram illustrating examples of CSI-RS beam management procedures, in accordance with the present disclosure.

FIG. 3 is a diagram illustrating examples 300, 310, and 320 of CSI-RS beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, and/or between a scheduled node and a scheduling node). In some aspects, the UE 120 and the base station 110 may be in a connected state (e.g., an RRC connected state).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 3 and example 300, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using DCI).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110, e.g., using an L1 report, to enable the base station 110 to select one or more beam pair(s) for communication between the base station 110 and the UE 120. While example 300 has been described in connection with CSI-RSs, the first beam management process may also use SSBs for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 3 and example 310, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120 in the L1 report.

As shown in FIG. 3, example 320 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 3 and example 320, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE 120 and the base station 110 may perform the third beam management procedure before performing the second beam management procedure, and/or the UE 120 and the base station 110 may perform a similar beam management procedure to select a UE transmit beam.

Figure 4A:
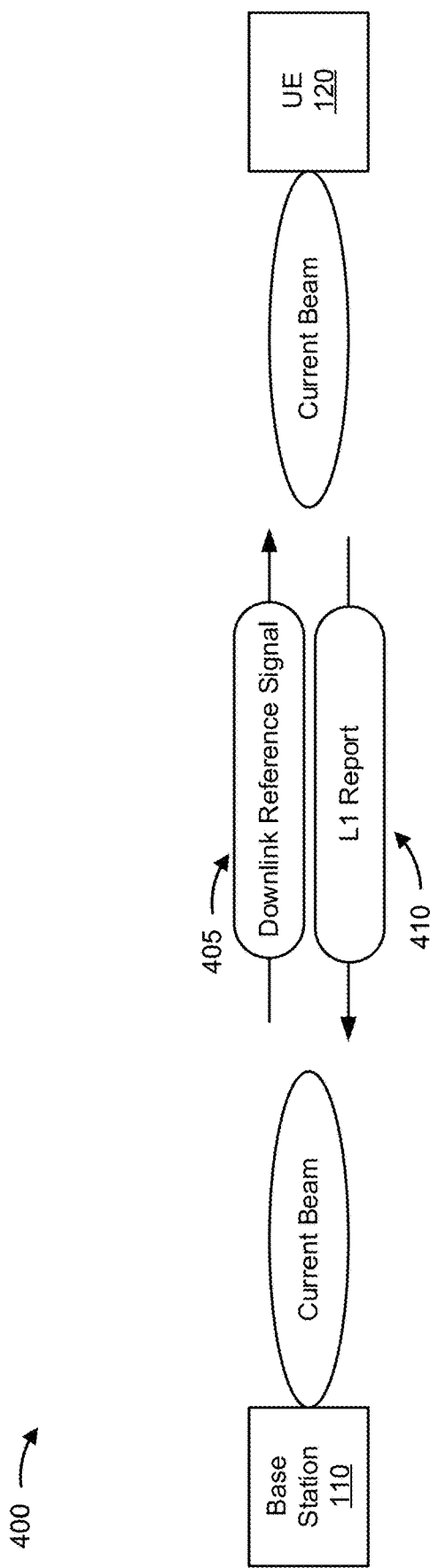
FIG. 4A is a diagram illustrating an example of L1 reporting, in accordance with the present disclosure.

FIG. 4A is a diagram illustrating an example 400 of L1 reporting, in accordance with the present disclosure. An L1 report may be transmitted by a UE (e.g., UE 120) to a base station (e.g., base station 110) in response to a downlink reference signal transmitted by the base station to the UE. An L1 report is a physical layer report that may be used to provide the base station with information that facilitates communications between the base station and the UE.

As shown by reference number 405, the base station may transmit a downlink reference signal to the UE. For example, a downlink reference signal, transmitted from the base station to the UE, may include a synchronization signal block (SSB), a channel state information (CSI) reference signal (CSI-RS), a demodulation reference signal (DMRS), a positioning reference signal (PRS), or a phase tracking reference signal (PTRS), among other examples.

An SSB may carry information used for initial network acquisition and synchronization, such as a primary synchronization signal (PSS), a secondary synchronization signal (SSS), a physical broadcast channel (PBCH), and a PBCH DMRS. An SSB is sometimes referred to as a synchronization signal/PBCH (SS/PBCH) block. In some examples, the base station may transmit multiple SSBs on multiple corresponding beams, and the SSBs may be used for beam selection and other beam management procedures, such as those described herein.

A CSI-RS may carry information used for downlink channel estimation (e.g., downlink CSI acquisition), which may be used for scheduling, link adaptation, or beam management (e.g., as described herein), among other examples. The base station may configure a set of CSI-RSs for the UE, and the UE may measure the configured set of CSI-RSs. Based at least in part on the measurements, the UE may perform channel estimation and may report channel estimation parameters to the base station in the L1 report (e.g., also referred to as a CSI report). The channel estimation parameters may include a channel quality indicator (CQI), a precoding matrix indicator (PMI), a CSI-RS resource indicator (CRI), a layer indicator (LI), a rank indicator (RI), a signal-to-interference-plus-noise ratio (SINR), or a reference signal received power (RSRP), among other examples. The base station may use the L1 report to select transmission parameters for downlink communications to the UE, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). A PTRS may carry information used to compensate for oscillator phase noise. Often, the phase noise increases as the oscillator carrier frequency increases. Thus, a PTRS can be utilized at high carrier frequencies, such as millimeter wave frequencies, to mitigate phase noise. A PRS may carry information used to enable timing or ranging measurements of the UE based on signals transmitted by the base station to improve observed time difference of arrival (OTDOA) positioning performance.

The L1 report may be used for a variety of purposes, including beam management procedures to facilitate beam selection between the UE and the base station, such as the beam management procedures described herein.

As shown by reference number 410, the UE may provide the base station with an L1 report based at least in part on receiving the downlink reference signal. An example L1 report may include measurements for one or more beams in one or more fields of the L1 report. For example, the L1 report may include one or more resource indicators (e.g., to identify beams associated with the L1 report) and/or signal measurements (e.g., one or more SINR values, RSRP values, and/or the like).

In addition to beam management procedures described herein, the measurements associated with the L1 report (e.g., SINR measurements, RSRP measurements, and/or the like) may also be used to facilitate beam failure detection and/or beam failure recovery processes. For example, in operation, the UE may need to perform a beam failure detection (BFD) measurement associated with the base station (e.g., such that the UE can detect a beam failure associated with the base station). For example, the UE may measure a characteristic (e.g., an SINR, RSRP, and/or the like) of a BFD reference signal (BFD-RS) (e.g., a SSB, a CSI-RS, and/or the like) on a beam associated with the base station. If the characteristic fails to satisfy a threshold (e.g., if the SINR and/or RSRP is lower than a particular value), then the UE may identify a beam failure instance. The UE detects a beam failure when the number of beam failure instances reaches a configured threshold within a particular period of time (e.g., before a configured timer expires). After the beam failure is detected, the UE may perform a beam failure recovery procedure, which includes initiating a RACH procedure and selecting a suitable beam to perform beam failure recovery. Upon completion of the RACH procedure, described further herein, beam failure recovery is considered complete.

As indicated above, FIG. 4A is provided as an example. Other examples may differ from what is described with respect to FIG. 4A.

Figure 4B:
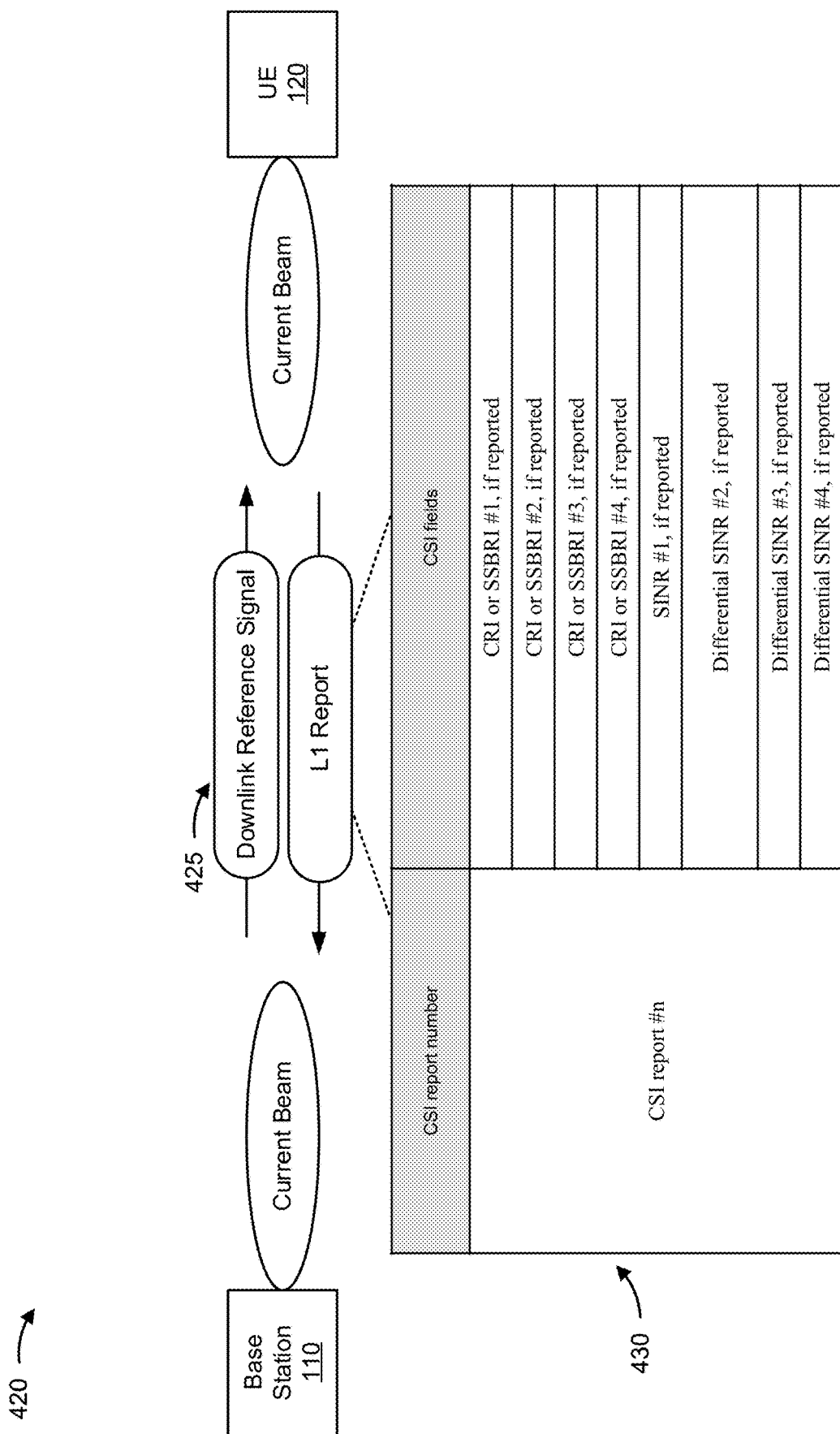
FIG. 4B is a diagram illustrating an example of an L1 report, in accordance with the present disclosure.

FIG. 4B is a diagram illustrating an example 420 of an L1 report, in accordance with the present disclosure. As shown in FIG. 4B, the L1 report may be transmitted by a UE (e.g., UE 120) to a base station (e.g., base station 110) in response to a downlink reference signal transmitted by the base station to the UE.

As shown by reference number 425, the base station may transmit a downlink reference signal to the UE. The downlink reference signal may be similar to the downlink reference signal described herein (e.g., with reference to FIGS. 3 and 4).

As shown by reference number 430, an example L1 report may include measurements for up to four beams per configured report. For example, the first four CSI fields in the example L1 report may indicate a CSI reference signal resource indicator (CRI) or an SS/PBCH block resource indicator (SSBRI) to identify beams associated with the report. The fifth field of the example CSI report may indicate an absolute SINR value. The last three fields of the example L1 report may include differential SINR values calculated with respect to the absolute SINR value. The SINR values, both absolute and differential, may facilitate beam selection in a manner that takes into account interference. While the example L1 report includes SINR values, other types of L1 reports may include other values indicative of beam quality, such as RSRP values and/or CQI values, among other examples.

As indicated above, FIG. 4B is provided as an example. Other examples may differ from what is described with respect to FIG. 4B.

Figure 4C:
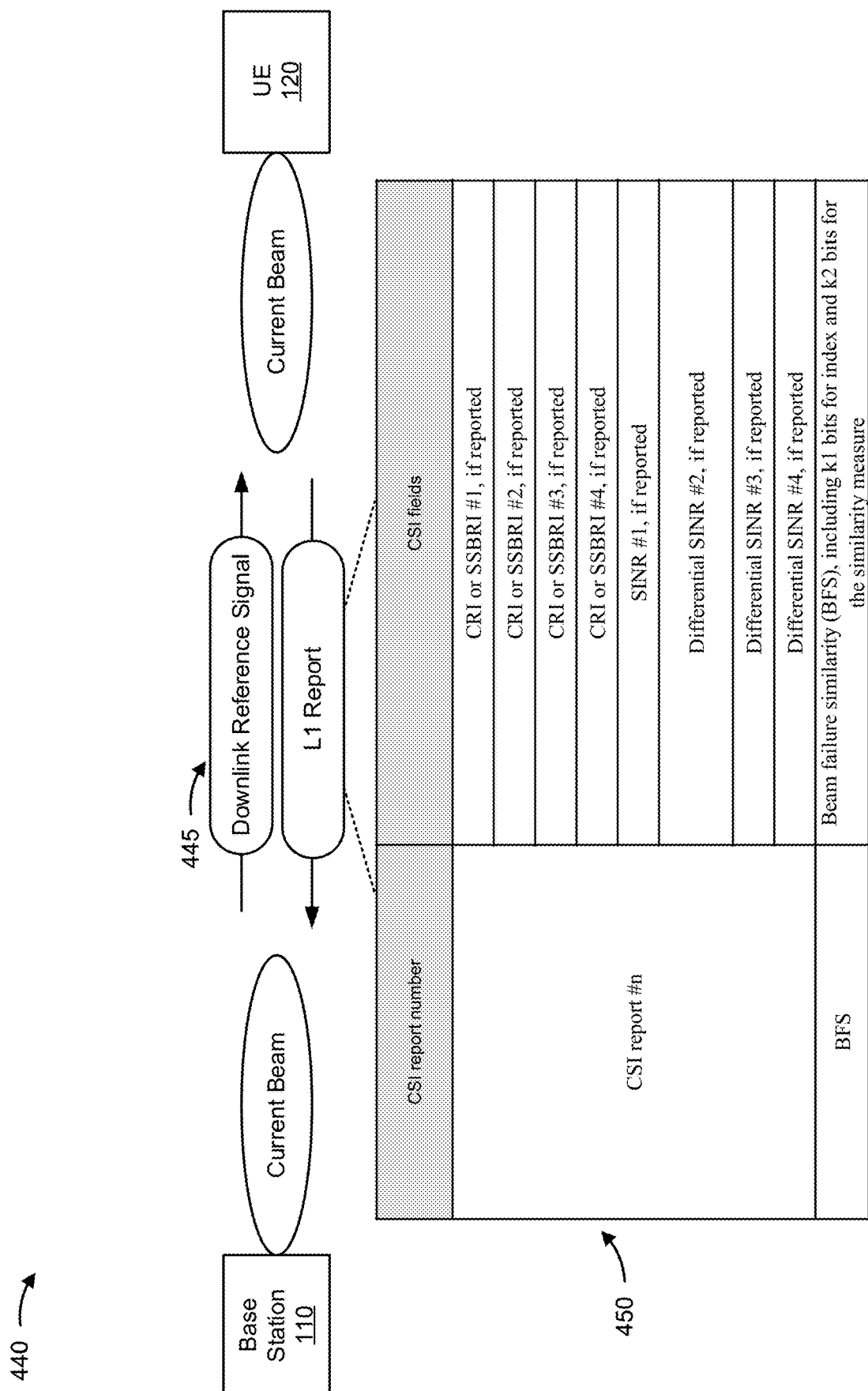
FIG. 4C is a diagram illustrating an example of an L1 report indicating conditions similar to a past event, in accordance with the present disclosure.

FIG. 4C is a diagram illustrating an example 440 of an L1 report indicating conditions similar to a past event, in accordance with the present disclosure. As shown in FIG. 4C, a UE (e.g., UE 120) may transmit, and a base station (e.g., base station 110) may receive, an L1 report in response to a downlink reference signal (e.g., CSI-RS) transmitted by the base station to the UE.

As shown by reference number 445, the base station may transmit a downlink reference signal to the UE. The downlink reference signal may be similar to the downlink reference signal described herein (e.g., with reference to FIGS. 3 and 4).

As shown by reference number 450, the example L1 report is an L1-SINR report having the first eight CSI fields indicating information similar to the information included in the example L1 report described herein (e.g., with reference to FIG. 4).

The example L1 report also includes an additional CSI field to indicate a measurement of similarity between a current condition of the UE and one or more past conditions of the UE (e.g., past conditions associated with past beam failure events). The indication may be referred to as beam failure similarity (BFS) and the example L1 report, or the portion indicating BFS, may be referred to as a BFS report. In some aspects, the CSI field may include k1 bits for an index and k2 bits for the similarity measure. For example, k1 may be 2 bits to identify one of four past beam failure events, and k2 may be 4 bits to indicate a measure of similarity between a current condition of the UE and a past condition of the UE associated with the beam failure event identified by k1. The manner in which the measure of similarity is determined is described further herein.

As indicated above, FIG. 4C is provided as an example. Other examples may differ from what is described with respect to FIG. 4C. For example, while the example L1 report is an L1-SINR report, the L1 report may be another type of L1 report, such as an L1-RSRP report. Similarly, a different number and/or different arrangement of bits may be used to indicate BFS.

Figure 5:
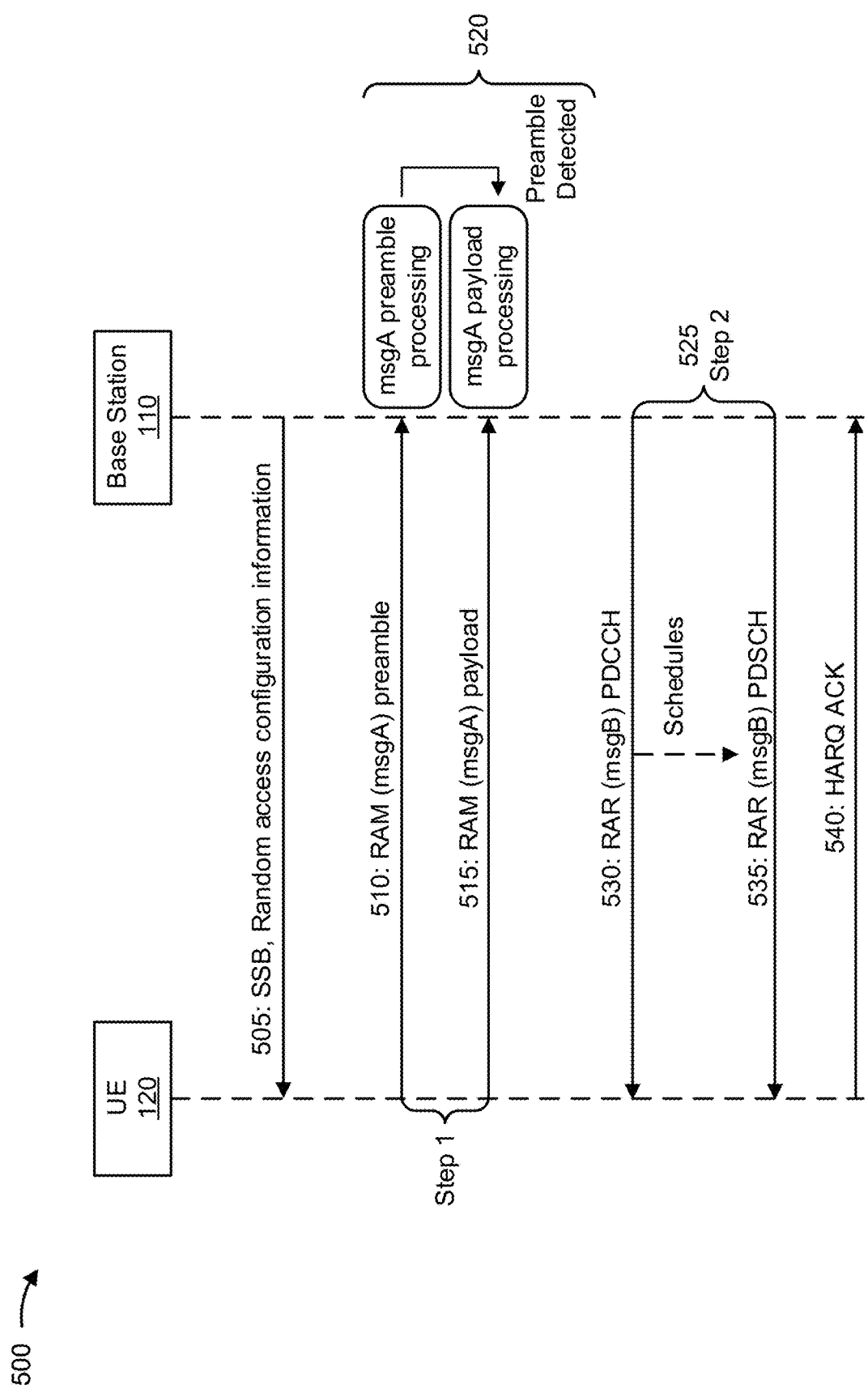
FIG. 5 is a diagram illustrating an example of a two-step random access procedure, in accordance with the present disclosure.

FIG. 5 is a diagram illustrating an example 500 of a two-step random access procedure, in accordance with the present disclosure. As shown in FIG. 5, a base station 110 and a UE 120 may communicate with one another to perform the two-step random access procedure.

As shown by reference number 505, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 510, the UE 120 may transmit, and the base station 110 may receive, a RAM preamble. As shown by reference number 515, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 520, the base station 110 may receive the RAM preamble transmitted by the UE 120. If the base station 110 successfully receives and decodes the RAM preamble, the base station 110 may then receive and decode the RAM payload.

As shown by reference number 525, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 530, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 535, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 540, if the UE 120 successfully receives the RAR, the UE 120 may transmit a hybrid automatic repeat request (HARD) acknowledgement (ACK).

In some situations, the UE 120 and base station 110 may use the two-step random access procedure when recovering from a beam failure event (e.g., as part of a beam failure recovery process).

As indicated above, FIG. 5 is provided as an example. Other examples may differ from what is described with regard to FIG. 5.

Figure 6:
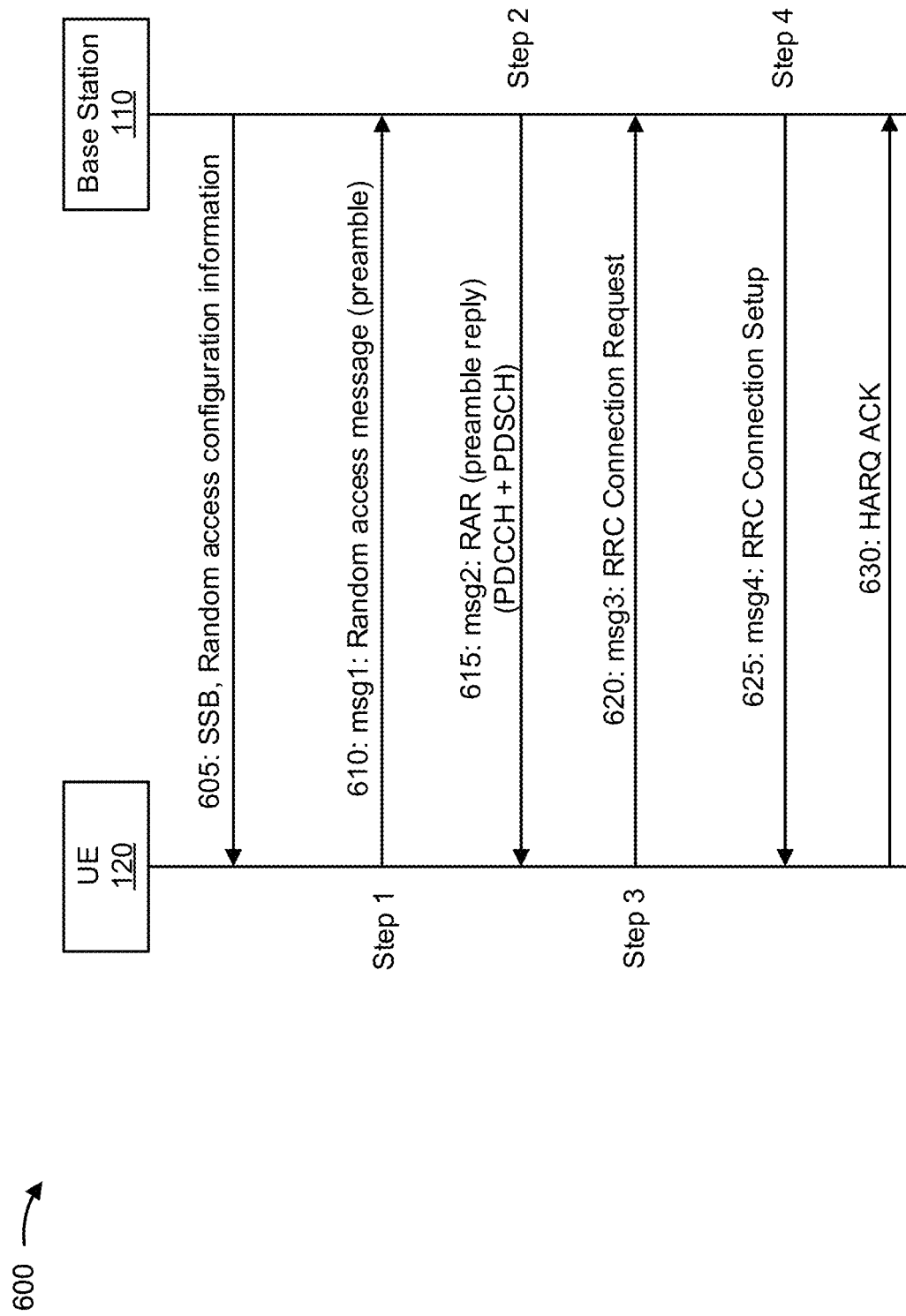
FIG. 6 is a diagram illustrating an example of a four-step random access procedure, in accordance with the present disclosure.

FIG. 6 is a diagram illustrating an example 600 of a four-step random access procedure, in accordance with the present disclosure. As shown in FIG. 6, a base station 110 and a UE 120 may communicate with one another to perform the four-step random access procedure.

As shown by reference number 605, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 610, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 615, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 620, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 625, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 630, if the UE 120 successfully receives the RRC connection setup message, the UE 120 may transmit a HARQ ACK.

In some situations, the UE 120 and base station 110 may use the four-step random access procedure when recovering from a beam failure event (e.g., as part of a beam failure recovery process).

As indicated above, FIG. 6 is provided as an example. Other examples may differ from what is described with regard to FIG. 6.

While reference signals enable the UE to perform beam failure detection and recovery procedures, including RACH procedures described herein, the beam failure detection and recovery procedures may use significant UE power and communication resources in recovering from beam failure, such as resources for performing a RACH procedure, beam sweeping, additional reporting, and/or the like. In addition, beam failure recovery, including RACH, takes time to perform, during which the UE may experience degraded communications capabilities, such as increased latency, decreased throughput, and/or the like. While the L1 report may provide the base station with an indication of signal quality (e.g., SINR, RSRP, and/or the like), the nature of the L1 report is designed to carry a limited amount of information in an effort to conserve resources, given the relatively high frequency at which the L1 reports are transmitted. While other types of reporting, such as Layer 3 (L3) reporting, minimization of drive test (MDT) reporting, and/or the like, are capable of carrying more information than some L1 reports, the additional reported information may take longer to process and/or transmit than the information in L1 reports, which may render some L3 reporting methods unsuitable for some time sensitive and/or resource limited applications.

Some techniques and apparatuses described herein enable a UE to detect a beam failure event (e.g., a beam failure instance and/or a beam failure recovery event, as described herein) associated with the UE and detect a first condition of the UE. A UE's condition may include a set of measurable properties that define a condition and/or state of the UE. The set of measurable properties may include, for example, information identifying the UE's location, a time associated with detecting the UE's condition, one or more UE signal measurements (e.g., RSRP, SINR, received signal strength indicator (RSSI) values, and/or the like) for one or more base stations and/or TRPs, among other examples. Based at least in part on a measure of similarity between the first condition of the UE and a second condition (e.g., a previous location, a previous time, a previous signal measurement, and/or the like) of the UE associated with a past beam failure event, the UE may perform one or more actions (e.g., actions designed to address the beam failure event). In some aspects, the measure of similarity may be included in information associated with an L1 report, as described herein. The one or more actions may include, in some aspects, continuing to use a current beam for communications with a base station, performing contention-free RACH with the base station, or performing contention-free RACH with a transmit receive point (TRP) separate from the base station. Using similarity of current UE conditions to past beam failure events may enable the UE and/or the base station to take one or more actions designed to address a potential beam failure, either before it occurs or after the beam failure. Using information regarding past beam failure events to make informed decisions in addressing a beam failure event may reduce the resources (e.g., time, processing, and/or communication resources, among other examples) used in determining how to handle the beam failure event. For example, rather than triggering a beam failure recovery process (e.g., RACH) that would use UE and base station resources to attempt to find a new beam for communications, the UE may opt to continue using a current beam for communications with the base station and forego the beam failure recovery process. In addition, using information regarding past beam failure events may reduce the resources (e.g., time, processing, and/or communication resources, among other examples) used to handle recovery from the beam failure event. For example, in a situation where a beam failure recovery process (e.g., RACH) is to be performed, the UE may use information regarding prior RACH procedures (e.g., RACH configuration information, one or more parameters for transmitting a random access message (RAM), one or more parameters for receiving a random access response (RAR) to the RAM, one or more parameters of an RAR message, among other examples) to more efficiently perform RACH with the base station or another TRP.

Figure 7:
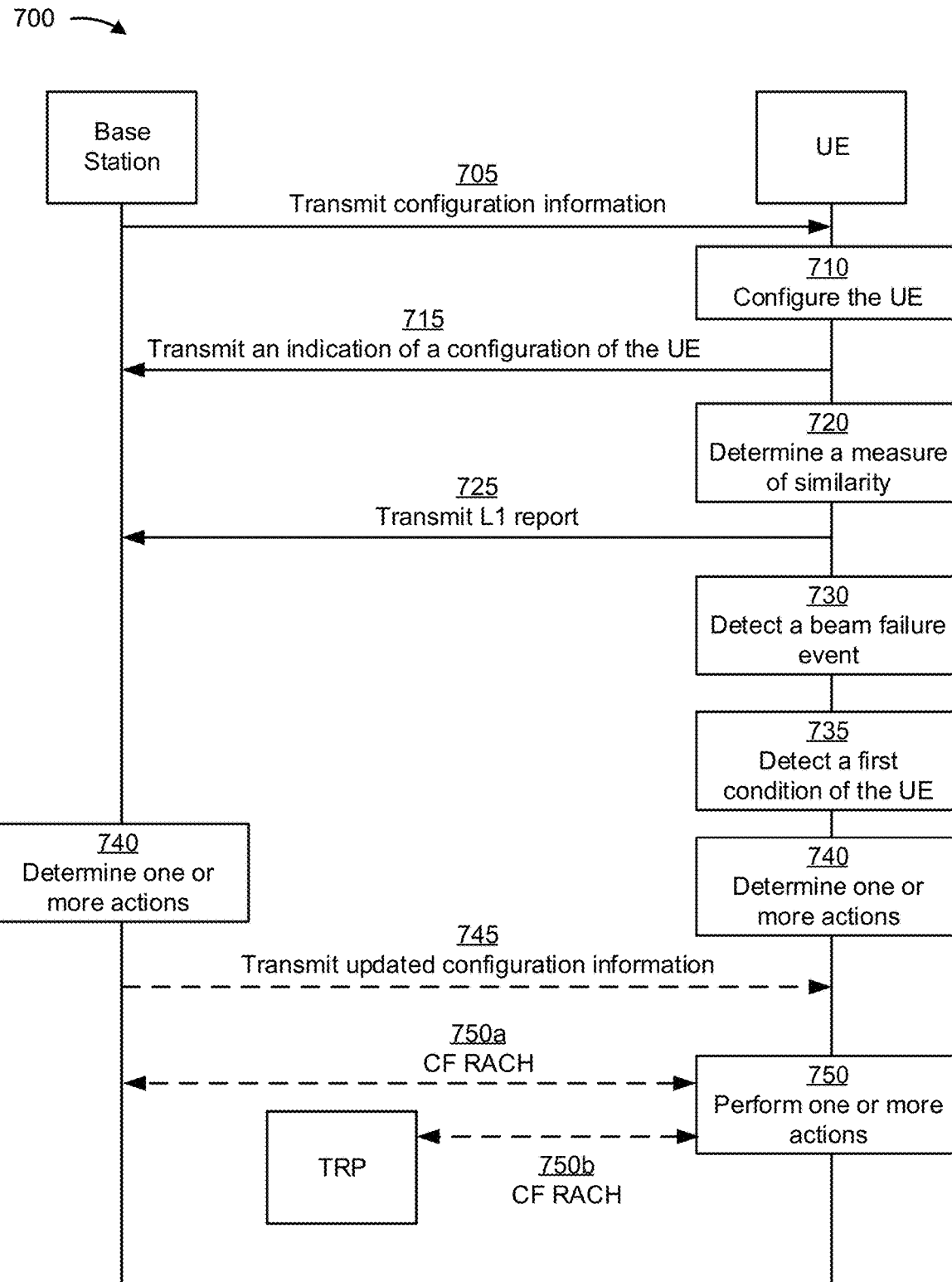
FIG. 7 is a diagram illustrating an example associated with beam failure recovery.

FIG. 7 is a diagram illustrating an example 700 associated with beam failure recovery. As shown in FIG. 7, a UE (e.g., UE 120) may communicate (e.g., transmit an uplink transmission and/or receive a downlink transmission) with a base station (e.g., base station 110). The UE and the base station may be part of a wireless network (e.g., wireless network 100).

As shown by reference number 705, the base station may transmit, and the UE may receive, configuration information. In some aspects, the UE may receive configuration information from another device (e.g., from another base station or another UE). In some aspects, the UE may receive the configuration information via RRC signaling and/or medium access control (MAC) signaling (e.g., MAC control elements (MAC CEs)). In some aspects, the configuration information may include an indication of one or more configuration parameters (e.g., already known to the UE) for selection by the UE and/or explicit configuration information for the UE to use to configure the UE.

In some aspects, the base station may transmit the configuration information to the UE based at least in part on the frequency range, frequency band, and/or subcarrier spacing associated with communications between the base station and the UE. For example, the base station may limit various aspects of beam failure recovery described herein to devices communicating in particular frequency ranges, frequency bands, and/or subcarrier spacings. In some aspects, the base station may transmit the configuration information to the UE based at least in part on the type of UE. For example, the base station may limit various aspects of the beam failure similarity reporting and recovery processes described herein to a reduced capability (RedCap) UE, or a subset of RedCap UEs, such as stationary UEs.

In some aspects, the configuration information may indicate that the UE is to transmit, to the base station, an L1 report indicating a measure of similarity between a current condition of the UE and a past condition of the UE associated with a past event associated with the UE. For example, the UE may be configured to provide a L1-SINR report, or an L1-RSRP report, which includes information indicating a measure of similarity between a current condition of the UE (e.g., a location, a time, signal measurement, and/or the like) and a past condition of the UE (e.g., a past location, a past time, past signal measurement) associated with a past beam failure event (e.g., a past beam failure instance and/or a past beam failure recovery event). In some aspects, the configuration information may specify a manner of determining the measure of similarity, as described further herein. In some aspects, the configuration information may indicate that the UE is to include, in the L1 report, a first number of bits for an event index (e.g., 2 bits) and a second number of bits (e.g., 4 bits) for the measure of similarity. In some aspects, the configuration information may indicate that the base station may be configured to receive the L1 report. For example, the base station may be configured to receive the L1 report and use the L1 report for subsequent configuration of the UE.

In some aspects, the configuration information may indicate one or more RACH resources (e.g., RACH configuration information, one or more parameters for transmitting a RAM, one or more parameters for receiving a RAR to the RAM, one or more parameters of an RAR message, among other examples) associated with contention-free (CF) RACH with one or more TRPs. The RACH resources may be used, for example, in a situation where the UE determines to perform CF RACH, as described herein, and switch to communications with another TRP separate from the base station.

In some aspects, the configuration information may indicate one or more RACH resources (e.g., RACH configuration information, one or more parameters for transmitting a RAM, one or more parameters for receiving a RAR to the RAM, one or more parameters of an RAR message, among other examples) associated with CF RACH with the base station. The RACH resources may be used, for example, in a situation where the UE determines to perform CF RACH, as described herein, and switch to communications via another beam pair with the base station.

In some aspects, the configuration information may indicate, for each of multiple past beam failure events that includes the past beam failure event, one or more corresponding actions to be performed by the UE. For example, the configuration information may specify different action(s) to be taken by the UE depending on which past beam failure event the current conditions of the UE are most similar to. In some aspects, the configuration information may indicate, for each of the past beam failure events, similarity criteria for performing the corresponding actions. For example, the similarity criteria may include a threshold measure of similarity between the first condition of the UE and the second condition of the UE. In this situation, the configuration information may indicate that, when the threshold is satisfied, the UE is to take a particular action (e.g., continue with the current beam, perform CF RACH with the base station, or perform CF RACH with another TRP).

As shown by reference number 710, the UE may configure the UE for communicating with the base station. In some aspects, the UE may configure the UE based at least in part on the configuration information. In some aspects, the UE may be configured to perform one or more operations described herein.

As shown by reference number 715, the UE may transmit, and the base station may receive, an indication of a configuration of the UE to communicate (e.g., via one or more of uplink transmissions) a BFS report to the base station. For example, the UE may indicate a configuration of the UE to determine a measure of similarity between a current condition of the UE and past conditions of the UE associated with past beam failure events and transmit information indicating the measure of similarity to the base station as part of an L1 report. In some aspects, the UE may transmit the indication of UE capability via RRC signaling, one or more MAC CEs, and/or a physical uplink control channel (PUCCH) message, among other examples.

As shown by reference number 720, the UE may determine the measure of similarity based at least in part on a prior UE location associated with the past event and/or a prior UE signal measurement associated with the past event. In some aspects, a condition of the UE may include a set of measurable properties that define a condition, and/or state of the UE. For example, the current condition of the UE may include information identifying the UE's current location (e.g., based on signal measurements, network information, static known location, and/or the like), one or more signal measurements associated with the base station and/or other network components (e.g., other base stations, TRPs, and/or the like), a current time (e.g., a timestamp) associated with the current condition (e.g., a time the location and/or signal measurements were detected), among other examples. In some aspects, the measure of similarity may be determined based at least in part on how close the UE's current location is to a prior UE location and how close one or more current signal measurements of the UE are to prior UE signal measurements. In some aspects, time (e.g., time of day) may also be a factor in determining the measure of similarity between the current condition of the UE and a past condition of the UE.

In some aspects, the location and signal measurements of the UE may be used to indicate that the UE is currently in the same or similar circumstances as the UE was for when a past event (e.g., beam failure event) occurred. As used herein, a first condition being similar to a second condition may mean that a measure of similarity between the first condition and the second condition satisfies a threshold. For example, in a situation where a measure of similarity is determined on a scale of 0 to 1, a threshold of 0.5 may be used to determine when conditions are similar. As another example, in a situation where a measure of similarity is determined on a scale of 0 to 15 (e.g., 4 bits), a threshold of 12 may be used to determine when conditions are similar. The measure of similarity may be calculated in a variety of ways. In some aspects, the measure of similarity may be a linear calculation based on a preconfigured minimum or maximum similarity value associated with UE location, signal measurements, and/or time. In some aspects, the measure of similarity may be determined using a machine learning model, a neural network model, or other modeling techniques. For example, based on historical instances of beam failure, beam failure recovery events, and/or the like, a machine learning model and/or a neural network model may be trained to determine the measure of similarity given one or more variables as input, such as the UE location, UE signal measurements, and/or time of day. In some aspects, a statistical estimation technique may be used to infer, from the information available to the UE (e.g., UE location, UE signal measurements, time of day, and/or the like) the measure of similarity.

In some aspects, determining the measure of similarity depends on a type of the L1 report. For example, the manner in which the UE determines the measure of similarity may be different for an L1-SINR report than for an L1-RSRP report. Differences may include, for example, different formulas for measuring similarity, different variables (e.g., UE location, UE signal measurements, time of day) being considered, and/or different sets of training data for different machine learning modeling, neural network modeling, statistical modeling, and/or other modeling techniques.

As noted herein, the manner of determining the measure of similarity may be specified by the configuration information. In some aspects, the manner of determining the measure of similarity may be predefined (e.g., in a standard or by UE configuration). In some aspects, portions of the manner of determining the measure of similarity may be specified by different sources (e.g., a portion specified by configuration data, another portion specified by a standard, and/or another portion preconfigured on the UE). For example, the structure of a machine learning model and/or neural network model may be at least partially defined by a standard specification and/or configured by the base station.

As shown by reference number 725, the UE may transmit, and the base station may receive, the L1 report. In some aspects, the L1 report may indicate a measure of similarity between a current condition of the UE and a past condition of the UE associated with a past event associated with the UE. For example, the L1 report may indicate how similar the current condition of the UE is to a past condition of the UE associated with a past beam failure event of the UE.

In some aspects, the L1 report includes an L1-SINR report. In some aspects, the L1 report includes an L1-RSRP report. For example, the L1 report may include the measure of similarity in an L1-SINR or L1-RSRP report (e.g., as described herein). In some aspects, the L1 report may include an event index identifying the past event from multiple past events. For example, while information regarding multiple past beam failure events may be stored by the UE and/or the base station, k1 bits of a CSI field of the L1 report may be used to identify a particular past beam failure event from multiple stored past beam failure events. In some aspects, the event index may begin from a most recent event of the multiple past events. For example, each of the four most recent beam failure events may be identified by a different event index value, with the most recent beam failure event beginning with an index of 0. In some aspects, a field of the L1 report may include 6 bits, wherein the measure of similarity may be indicated by 4 bits included in the L1 report, and the index identifying the past event may be indicated by 2 bits included in the L1 report. For example, a CSI field of the L1 report may include 2 bits as an index, capable of identifying up to four past beam failure events, and 4 bits for the measure of similarity, capable of identifying up to 16 different measures of similarity.

In some aspects, the index may be used to indicate the most similar beam failure events among the past k beam failure events. For example, rather than storing index information for the most recent k beam failure events, the UE and/or the base station may store index information enabling identification of the past k beam failure events having corresponding past UE conditions that are most similar to the current UE condition. In some aspects, the measure of similarity may be greater than other measures of similarity associated with other past conditions associated with other past events. For example, past UE conditions identified in the L1 report may be the most similar from multiple past UE conditions for which data is stored by the UE. This may enable the UE to identify, to the base station, the past UE condition and corresponding beam failure event that might be most relevant to the current UE condition. The BFS data may also enable the UE to determine how to handle beam failure events, as described further herein.

As shown by reference number 730, the UE may detect a beam failure event associated with the UE. For example, the UE may use various reference signal measurements (e.g., RSRP, SINR, and/or the like), over time and/or based on threshold comparisons and as described further herein, to detect a beam failure event. Detecting the beam failure event may include detecting a beam failure instance, including a beam failure instance that would trigger a beam failure recovery event, as described further herein.

As shown by reference number 735, the UE may detect a first condition of the UE. For example, the first condition of the UE may be detected in a manner similar to detecting the current condition (e.g., as described herein). Accordingly, the first condition may include the UE's location (e.g., based on signal measurements, network information, static known location, and/or the like), signal measurements associated with the base station and/or other network components (e.g., other base stations, TRPs, and/or the like), and/or a time measurement (e.g., indicating a point in time associated with the first condition).

As shown by reference number 740, the UE and/or the base station may determine one or more actions to perform. While described herein with respect to the UE determining the one or more actions, in some aspects, the base station may determine the one or more actions, instead of or in addition to the UE determining the one or more actions, and the base station may provide updated configuration information regarding the one or more actions to be taken, as described further herein. In some aspects, the one or more actions may include continuing to use a current beam for communications with a base station, performing CF RACH with the base station, or performing contention-free RACH with a TRP separate from the base station.

In some aspects, the UE may determine the one or more actions based at least in part on one or more past actions performed by the UE in association with the past beam failure event. For example, the UE may obtain information indicating that one or more past actions performed by the UE in association with the past beam failure event were successful and, based at least in part on the one or more past actions being identified as successful, determine the one or more actions (e.g., as the one or more past actions). In a situation where the UE, in prior conditions similar to the first condition of the UE, performed CF RACH with the base station successfully, the UE may determine to perform CF RACH with the base station. As used herein, "successfully" performing one of the one or more actions may include a beam failure recovery procedure that resulted in communications being established or re-established. As another example, the UE may obtain information indicating that one or more past actions performed by the UE in association with the past beam failure event were unsuccessful and, based at least in part on the one or more past actions being unsuccessful, determine the one or more actions to be performed. For example, in a situation where a past action taken by the UE under similar conditions was not successful, the UE may determine to try another action. Thus, in a situation where performing CF RACH with the base station was not successful for the past beam failure event, the UE may determine to perform CF RACH with a different TRP instead.

In some aspects, the configuration information may indicate, for each of multiple past beam failure events that includes the past beam failure event, one or more corresponding actions to be performed by the UE. The UE may determine the one or more actions to perform based at least in part on the one or more corresponding actions indicated for the past beam failure event. The configuration information may be initial configuration information (e.g., configuration information described with reference to 705) or updated configuration information provided at a later time (e.g., based at least in part on the L1 report(s)).

In some aspects, the configuration information may indicate, for each of multiple past beam failure events, similarity criteria for performing the one or more corresponding actions. In this situation, the UE may determine the one or more actions based at least in part on the first condition of the UE satisfying the similarity criteria. For example, the similarity criteria may include a threshold measure of similarity between the first condition of the UE and the second (e.g., past) condition of the UE. In a situation where the threshold is satisfied, the UE may perform the one or more corresponding actions indicated in the configuration information for the corresponding past beam failure event.

In some aspects, as described further herein, the configuration information may indicate one or more RACH resources associated with CF RACH with one or more TRPs, and/or with the base station, and the indicated RACH resources may be used to perform CF RACH with the base station or a TRP of the one or more TRPs. This may enable the UE to perform CF RACH with RACH resources that are previously configured, rather than relying on a more general RACH process (e.g., described herein) that may consume additional processing resources, time, and bandwidth to identify RACH resources.

As shown by reference number 745, the base station may transmit, and the UE may receive, updated configuration information. For example, while the initial configuration information may include a variety of information that may be used by the UE to determine the one or more actions to perform in association with the beam failure event, the base station may periodically update the configuration of the UE. For example, based at least in part on L1 reports that include additional BFS information, the base station may update the action(s) to be taken in various UE conditions. When updating the one or more actions to be performed by the UE, the base station may use updated configuration information to reconfigure the UE to handle future beam failure events.

As shown by reference numbers 750, 750*a*, and 750*b*, the UE may perform the one or more actions. As described herein, the one or more actions may include continuing to use a current beam for communications with the base station (not shown in FIG. 7), performing CF RACH with the base station (e.g., as shown by reference number 750*a*), or performing CF RACH with a TRP separate from the base station (e.g., as shown by reference number 750*b*).

As indicated above, FIG. 7 is provided as an example. Other examples may differ from what is described with regard to FIG. 7.

Figure 8:
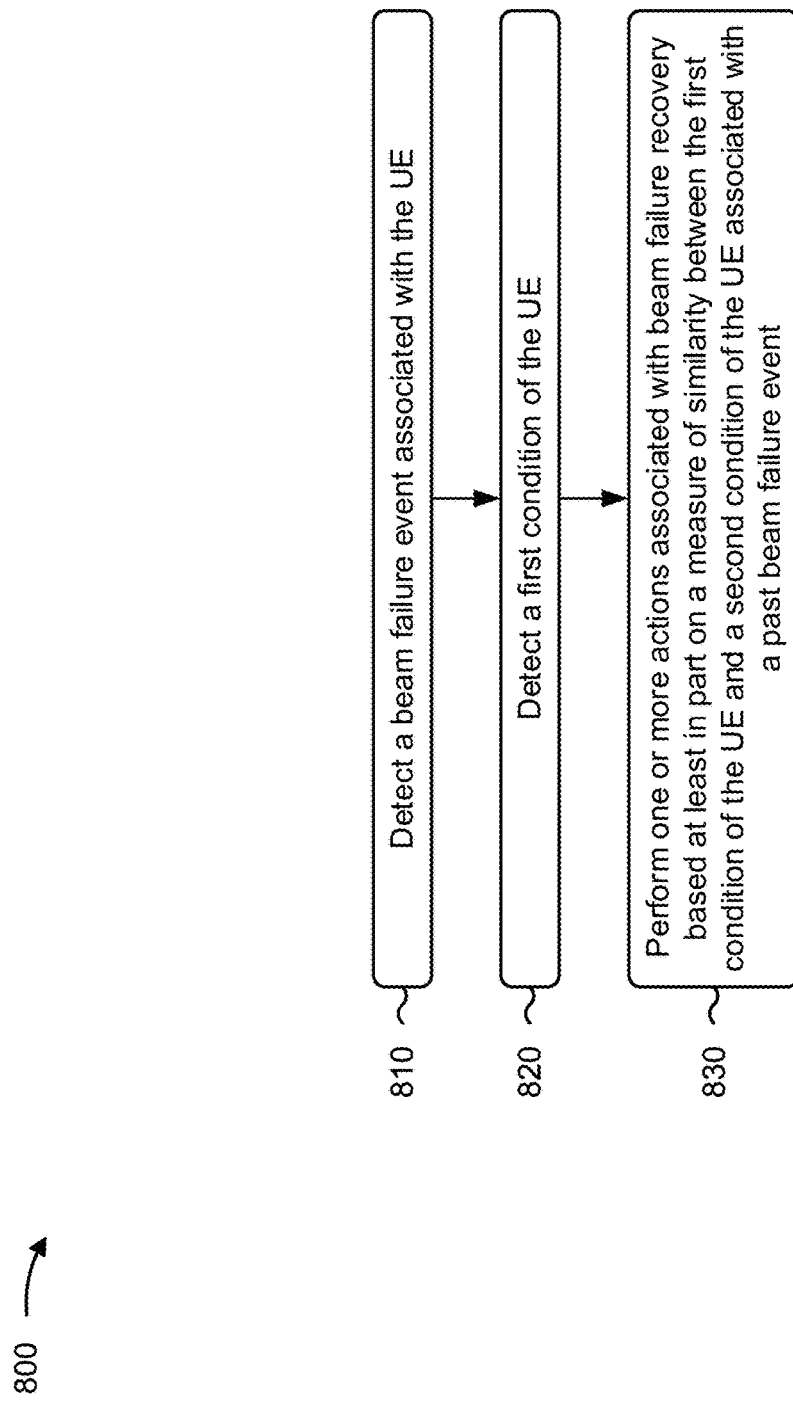
FIG. 8 is a diagram illustrating an example process associated with beam failure recovery, in accordance with the present disclosure.

FIG. 8 is a diagram illustrating an example process 800 associated with beam failure recovery, in accordance with the present disclosure. Example process 800 is an example where the UE (e.g., UE 120) performs operations associated with beam failure recovery.

As shown in FIG. 8, in some aspects, process 800 may include detecting a beam failure event associated with the UE (block 810). For example, the UE (e.g., using communication manager 140, depicted in FIG. 10) may detect a beam failure event associated with the UE, as described above.

As further shown in FIG. 8, in some aspects, process 800 may include detecting a first condition of the UE (block 820). For example, the UE (e.g., using communication manager 140, depicted in FIG. 10) may detect a first condition of the UE, as described above.

As further shown in FIG. 8, in some aspects, process 800 may include performing one or more actions associated with beam failure recovery based at least in part on a measure of similarity between the first condition of the UE and a second condition of the UE associated with a past beam failure event (block 830). For example, the UE (e.g., using communication manager 140, depicted in FIG. 10) may perform one or more actions associated with beam failure recovery based at least in part on a measure of similarity between the first condition of the UE and a second condition of the UE associated with a past beam failure event, as described above.

Process 800 may include additional aspects, such as any single aspect or any combination of aspects described below and/or in connection with one or more other processes described elsewhere herein.

In a first aspect, performing the one or more actions includes continuing to use a current beam for communications with a base station, performing CF RACH with the base station, or performing CF RACH with a TRP separate from the base station.

In a second aspect, alone or in combination with the first aspect, process 800 includes determining the one or more actions based at least in part on one or more past actions performed by the UE in association with the past beam failure event.

In a third aspect, alone or in combination with one or more of the first and second aspects, process 800 includes obtaining information indicating that one or more past actions performed by the UE in association with the past beam failure event were successful, and determining the one or more actions based at least in part on the one or more past actions being identified as successful.

In a fourth aspect, alone or in combination with one or more of the first through third aspects, determining the one or more actions to perform comprises obtaining information indicating that one or more past actions performed by the UE in association with the past beam failure event were unsuccessful, and determining the one or more actions based at least in part on the one or more past actions being unsuccessful.

In a fifth aspect, alone or in combination with one or more of the first through fourth aspects, process 800 includes receiving configuration information indicating, for each of a plurality of past beam failure events that includes the past beam failure event, one or more corresponding actions to be performed by the UE, and determining the one or more actions based at least in part on the one or more corresponding actions indicated for the past beam failure event.

In a sixth aspect, alone or in combination with one or more of the first through fifth aspects, the configuration information further indicates, for each of the plurality of past beam failure events, similarity criteria for performing the one or more corresponding actions, and determining the one or more actions further comprises determining the one or more actions based at least in part on the first condition of the UE satisfying the similarity criteria.

In a seventh aspect, alone or in combination with one or more of the first through sixth aspects, the similarity criteria comprise a threshold measure of similarity between the first condition of the UE and the second condition of the UE.

In an eighth aspect, alone or in combination with one or more of the first through seventh aspects, process 800 includes receiving configuration information indicating one or more RACH resources associated with CF RACH with one or more TRPs, and performing the one or more actions includes performing the CF RACH with a TRP included in the one or more TRPs using the one or more RACH resources.

In a ninth aspect, alone or in combination with one or more of the first through eighth aspects, process 800 includes receiving configuration information indicating one or more RACH resources associated with CF RACH with a base station, and performing the one or more actions includes performing the CF RACH with the base station using the one or more RACH resources.

In a tenth aspect, alone or in combination with one or more of the first through ninth aspects, the UE is a reduced capability UE.

In an eleventh aspect, alone or in combination with one or more of the first through tenth aspects, the measure of similarity is indicated by four bits included in a BFS report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
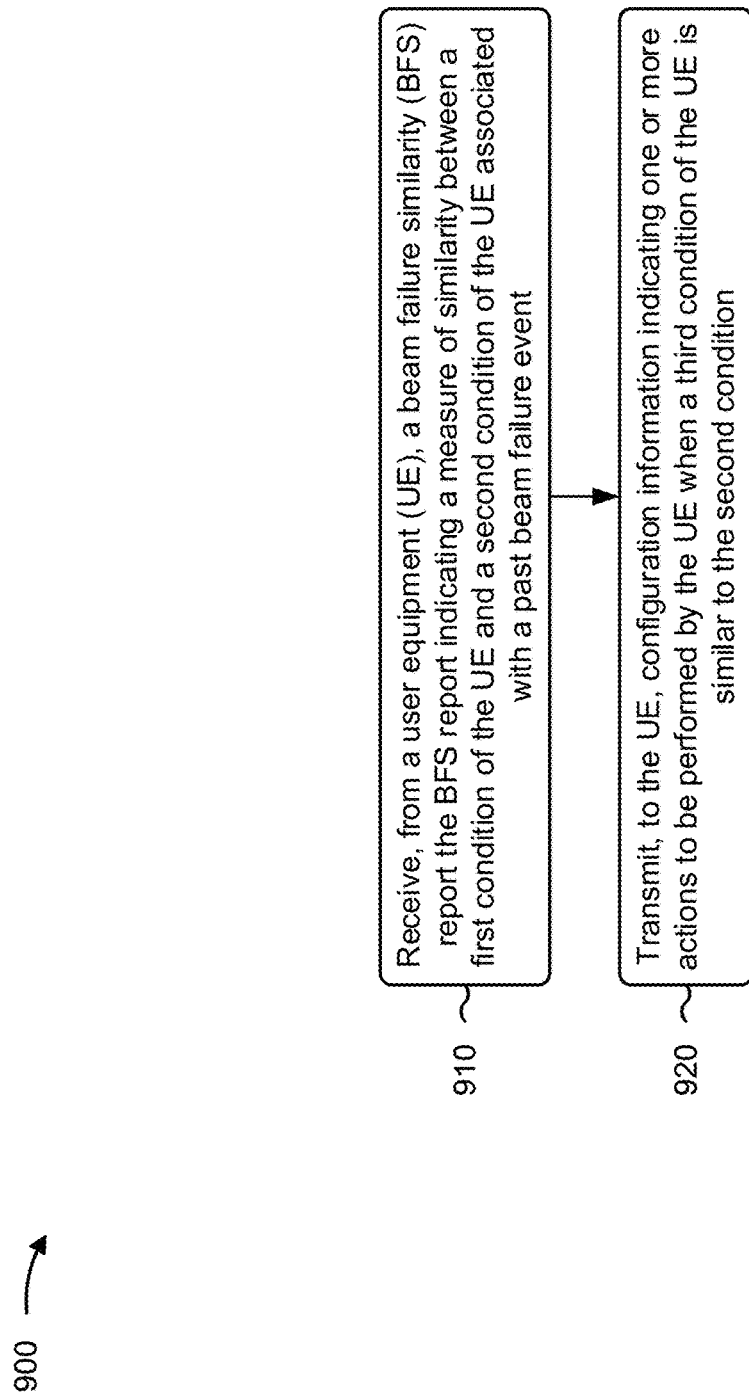
FIG. 9 is a diagram illustrating an example process associated with beam failure similarity and beam failure recovery.

FIG. 9 is a diagram illustrating an example process 900 associated with beam failure similarity and beam failure recovery, in accordance with the present disclosure. Example process 900 is an example where the base station (e.g., base station 110) performs operations associated with beam failure recovery.

As shown in FIG. 9, in some aspects, process 900 may include receiving, from a UE, a beam failure similarity (BFS) report, the BFS report indicating a measure of similarity between a first condition of the UE and a second condition of the UE associated with a past beam failure event (block 910). For example, the base station (e.g., using communication manager 150 and/or reception component 1302, depicted in FIG. 13) may receive, from a UE, a BFS report, the BFS report indicating a measure of similarity between a first condition of the UE and a second condition of the UE associated with a past beam failure event, as described above.

As further shown in FIG. 9, in some aspects, process 900 may include transmitting, to the UE, configuration information indicating one or more actions to be performed by the UE when a third condition of the UE is similar to the second condition (block 920). For example, the base station (e.g., using communication manager 150 and/or transmission component 1304, depicted in FIG. 13) may transmit, to the UE, configuration information indicating one or more actions to be performed by the UE when a third condition of the UE is similar to the second condition, as described above.

Process 900 may include additional aspects, such as any single aspect or any combination of aspects described below and/or in connection with one or more other processes described elsewhere herein.

In a first aspect, the one or more actions include continuing to use a current beam for communications with the base station, performing CF RACH with the base station, or performing CF RACH with a TRP separate from the base station.

In a second aspect, alone or in combination with the first aspect, process 900 includes determining the one or more actions based at least in part on one or more past actions performed by the UE in association with the past beam failure event.

In a third aspect, alone or in combination with one or more of the first and second aspects, process 900 includes obtaining information indicating that one or more past actions performed by the UE in association with the past beam failure event were successful, and determining the one or more actions based at least in part on the one or more past actions being successful.

In a fourth aspect, alone or in combination with one or more of the first through third aspects, determining the one or more actions to perform comprises obtaining information indicating that one or more past actions performed by the UE in association with the past beam failure event were unsuccessful, and determining the one or more actions based at least in part on the one or more past actions being unsuccessful.

In a fifth aspect, alone or in combination with one or more of the first through fourth aspects, the configuration information further indicates, for each of one or more other past beam failure events associated with corresponding conditions of the UE, one or more corresponding actions to be performed by the UE based at least in part on the third condition of the UE being similar to one of the corresponding conditions of the UE.

In a sixth aspect, alone or in combination with one or more of the first through fifth aspects, the configuration information further indicates similarity criteria for performing the one or more actions.

In a seventh aspect, alone or in combination with one or more of the first through sixth aspects, the similarity criteria comprise a threshold measure of similarity between the first condition of the UE and the second condition of the UE.

In an eighth aspect, alone or in combination with one or more of the first through seventh aspects, process 900 includes transmitting other configuration information indicating one or more RACH resources associated with contention-free RACH with one or more TRPs, and the one or more actions include performing the CF RACH with a TRP included in the one or more TRPs using the one or more RACH resources.

In a ninth aspect, alone or in combination with one or more of the first through eighth aspects, process 900 includes transmitting other configuration information indicating one or more RACH resources associated with CF RACH with the base station, and the one or more actions include performing the CF RACH with the base station using the one or more RACH resources.

In a tenth aspect, alone or in combination with one or more of the first through ninth aspects, transmitting the configuration information comprises transmitting the configuration information based at least in part on the UE being a reduced capability UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
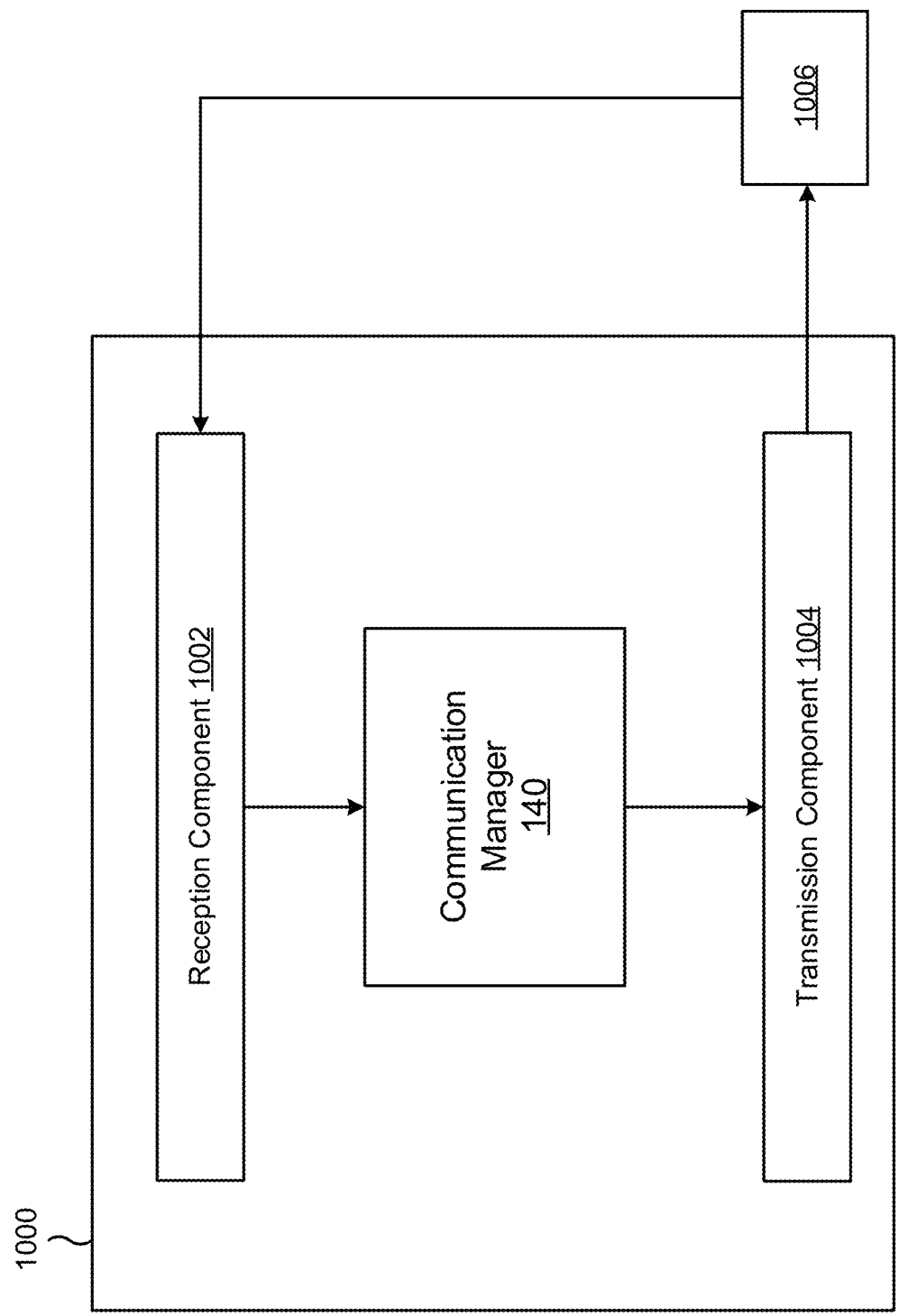
FIG. 10 is a diagram of an example apparatus for wireless communication.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 140 may detect a beam failure event associated with the UE. The communication manager 140 may detect a first condition of the UE. The communication manager 140 may perform one or more actions associated with beam failure recovery based at least in part on a measure of similarity between the first condition of the UE and a second condition of the UE associated with a past beam failure event.

The communication manager 140 may determine the one or more actions based at least in part on one or more past actions performed by the UE in association with the past beam failure event.

The communication manager 140 may obtain information indicating that one or more past actions performed by the UE in association with the past beam failure event were successful.

The communication manager 140 may determine the one or more actions based at least in part on the one or more past actions being identified as successful.

The reception component 1002 may receive configuration information indicating, for each of a plurality of past beam failure events that includes the past beam failure event, one or more corresponding actions to be performed by the UE.

The communication manager 140 may determine the one or more actions based at least in part on the one or more corresponding actions indicated for the past beam failure event.

The reception component 1002 may receive configuration information indicating one or more RACH resources associated with contention-free RACH with one or more TRPs.

The reception component 1002 may receive configuration information indicating one or more RACH resources associated with contention-free RACH with a base station.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
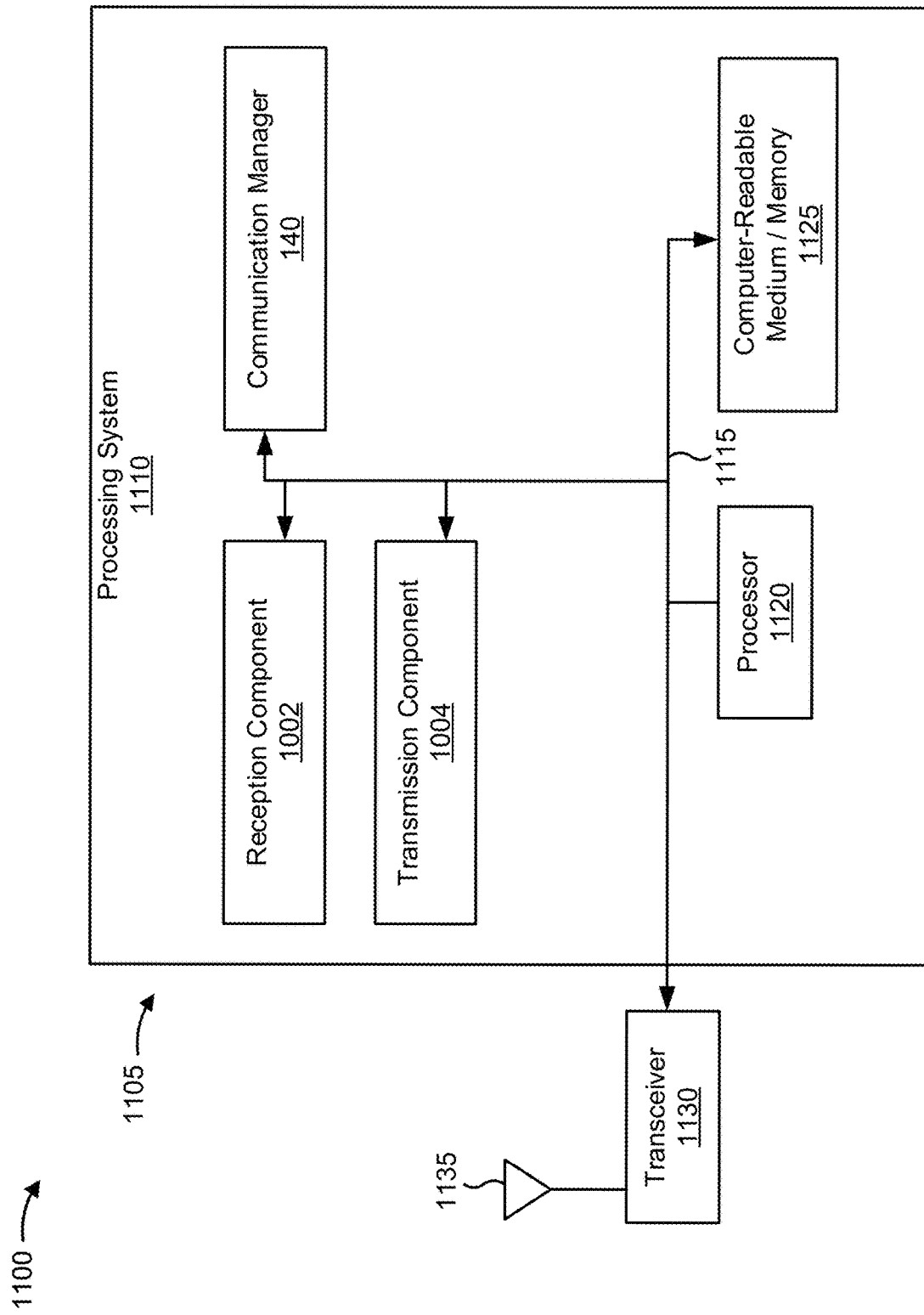
FIG. 11 is a diagram illustrating an example of a hardware implementation for an apparatus employing a processing system.

FIG. 11 is a diagram illustrating an example 1100 of a hardware implementation for an apparatus 1105 employing a processing system 1110. The apparatus 1105 may be a UE.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, and/or power management circuits.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1004, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for means for detecting a beam failure event associated with the UE; means for detecting a first condition of the UE; and/or means for performing one or more actions associated with beam failure recovery based at least in part on a measure of similarity between the first condition of the UE and a second condition of the UE associated with a past beam failure event. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
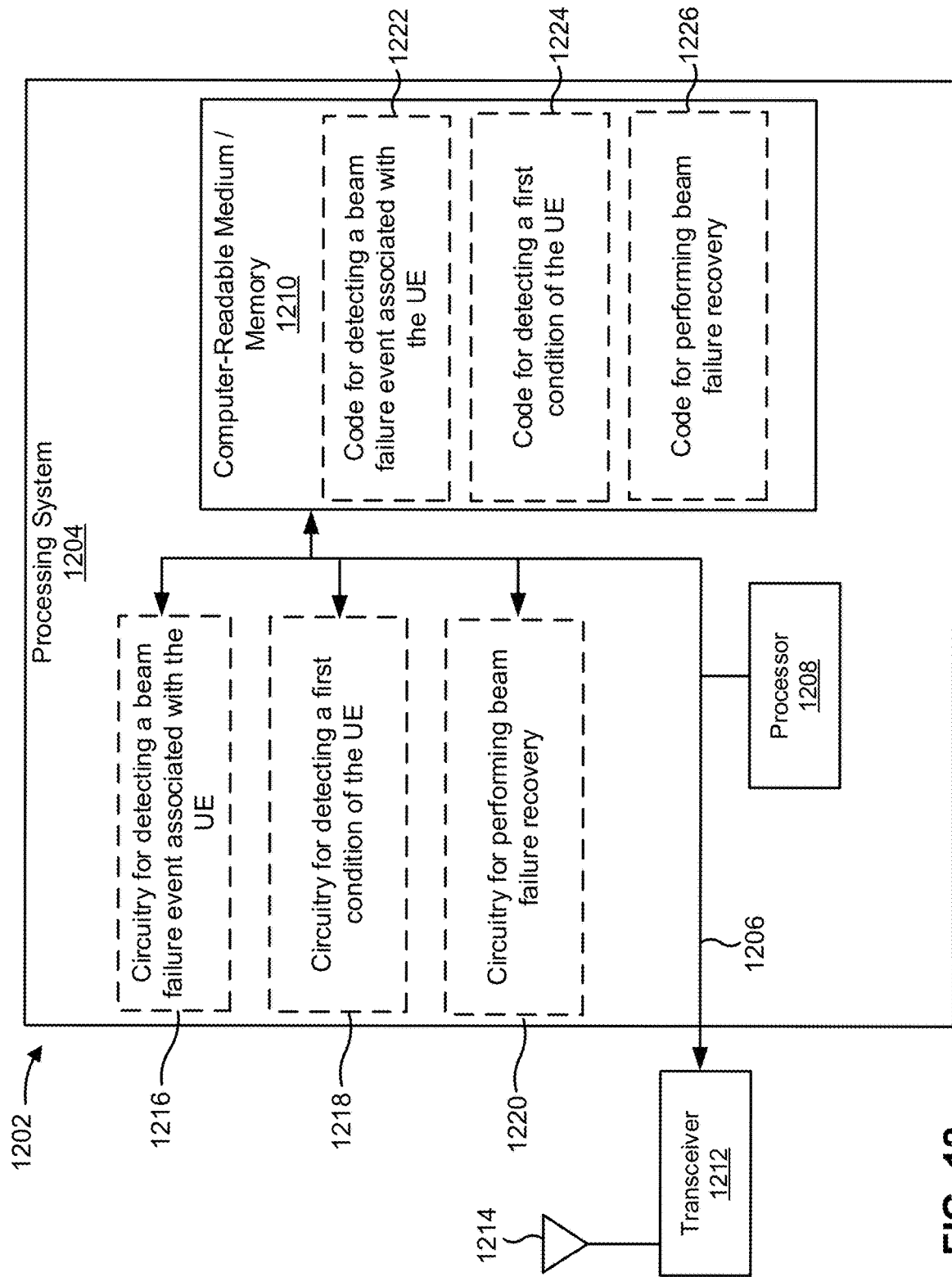
FIG. 12 is a diagram illustrating an example of an implementation of code and circuitry for an apparatus for wireless communication.

FIG. 12 is a diagram illustrating an example 1200 of an implementation of code and circuitry for an apparatus 1202 for wireless communication. The apparatus 1202 may be, be similar to, include, or be included in the apparatus 1000 shown in FIG. 10 and/or the apparatus 1102 shown in FIG. 11. For example, the apparatus 1202 may be, or include, a UE. The apparatus 1202 may include a processing system 1204, which may include a bus 1206 coupling one or more components such as, for example, a processor 1208, computer-readable medium/memory 1210, a transceiver 1212, and/or the like. As shown, the transceiver 1212 may be coupled to one or more antenna 1214.

As further shown in FIG. 12, the apparatus 1202 may include circuitry for detecting a beam failure event associated with the UE (circuitry 1216). For example, the apparatus 1202 may include circuitry 1216 to enable the apparatus 1202 to detect a beam failure event associated with the UE.

As further shown in FIG. 12, the apparatus 1202 may include circuitry for detecting a first condition of the UE (circuitry 1218). For example, the apparatus 1202 may include circuitry 1218 to enable the apparatus 1202 to detect a first condition of the UE.

As further shown in FIG. 12, the apparatus 1202 may include circuitry for performing beam failure recovery (circuitry 1220). For example, the apparatus 1202 may include circuitry 1220 to enable the apparatus 1202 to perform one or more actions associated with beam failure recovery based at least in part on a measure of similarity between the first condition of the UE and a second condition of the UE associated with a past beam failure event.

As further shown in FIG. 12, the apparatus 1202 may include, stored in computer-readable medium 1210, code for detecting a first condition of the UE (code 1222). For example, the apparatus 1202 may include code 1222 that, when executed by the processor 1208, may cause the transceiver 1212 to detect a first condition of the UE.

As further shown in FIG. 12, the apparatus 1202 may include, stored in computer-readable medium 1210, code for detecting a first condition of the UE (code 1224). For example, the apparatus 1202 may include code 1224 that, when executed by the processor 1208, may cause the transceiver 1212 to detect a first condition of the UE.

As further shown in FIG. 12, the apparatus 1202 may include, stored in computer-readable medium 1210, code for performing beam failure recovery (code 1226). For example, the apparatus 1202 may include code 1224 that, when executed by the processor 1208, may cause the transceiver 1212 to perform one or more actions associated with beam failure recovery based at least in part on a measure of similarity between the first condition of the UE and a second condition of the UE associated with a past beam failure event.

FIG. 12 is provided as an example. Other examples may differ from what is described in connection with FIG. 12.

Figure 13:
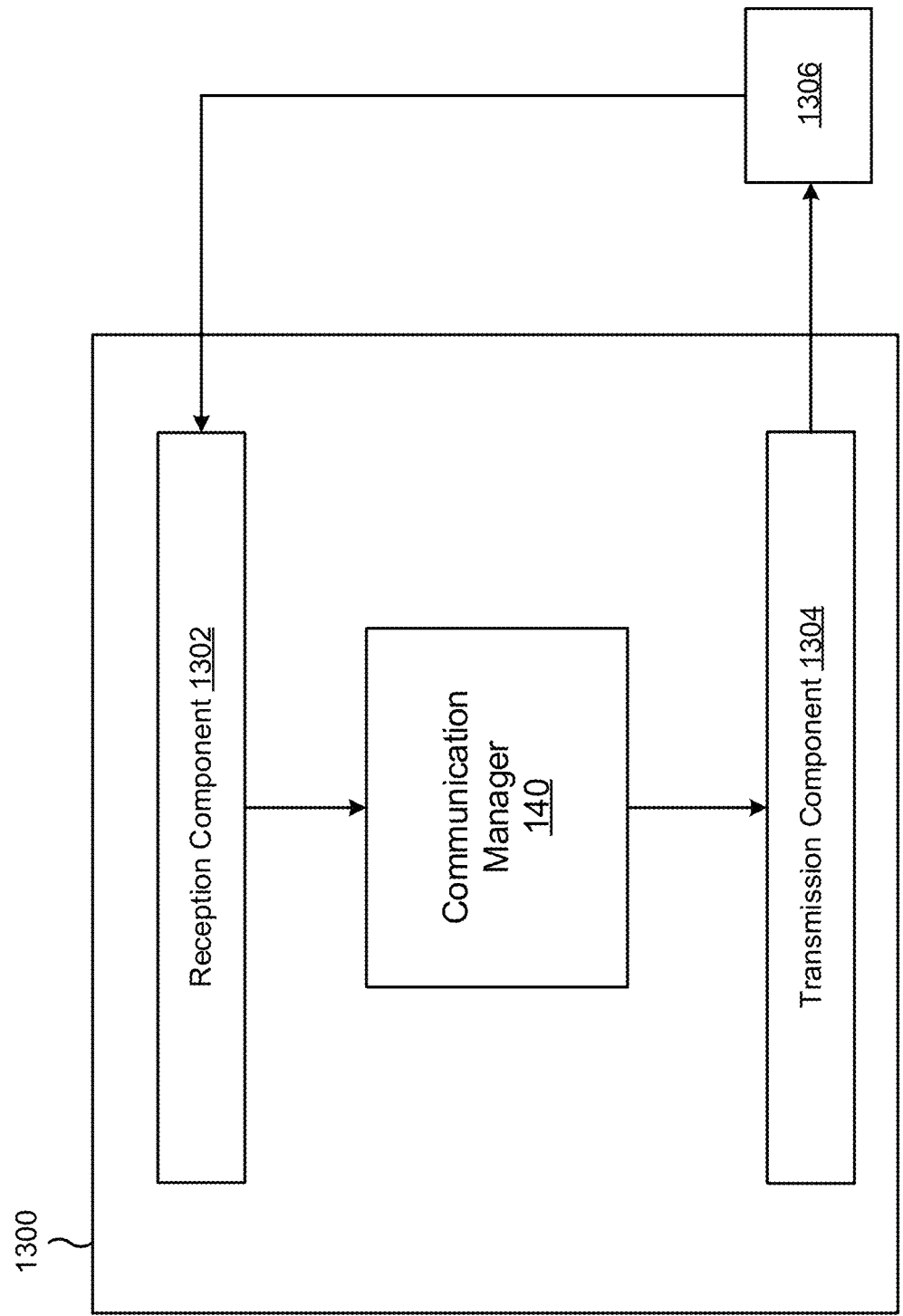
FIG. 13 is a diagram of an example apparatus for wireless communication.

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150.

In some aspects, the apparatus 1300 may be configured to perform one or more operations described herein in connection with FIGS. 7-9. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The reception component 1302 may receive, from a UE, a beam failure similarity (BFS) report, the BFS report indicating a measure of similarity between a first condition of the UE and a second condition of the UE associated with a past beam failure event. The transmission component 1304 may transmit, to the UE, configuration information indicating one or more actions to be performed by the UE when a third condition of the UE is similar to the second condition.

The communication manager 150 may determine the one or more actions based at least in part on one or more past actions performed by the UE in association with the past beam failure event.

The communication manager 150 may obtain information indicating that one or more past actions performed by the UE in association with the past beam failure event were successful.

The communication manager 150 may determine the one or more actions based at least in part on the one or more past actions being successful.

The transmission component 1304 may transmit other configuration information indicating one or more RACH resources associated with contention-free RACH with one or more TRPs.

The transmission component 1304 may transmit other configuration information indicating one or more RACH resources associated with contention-free RACH with the base station.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
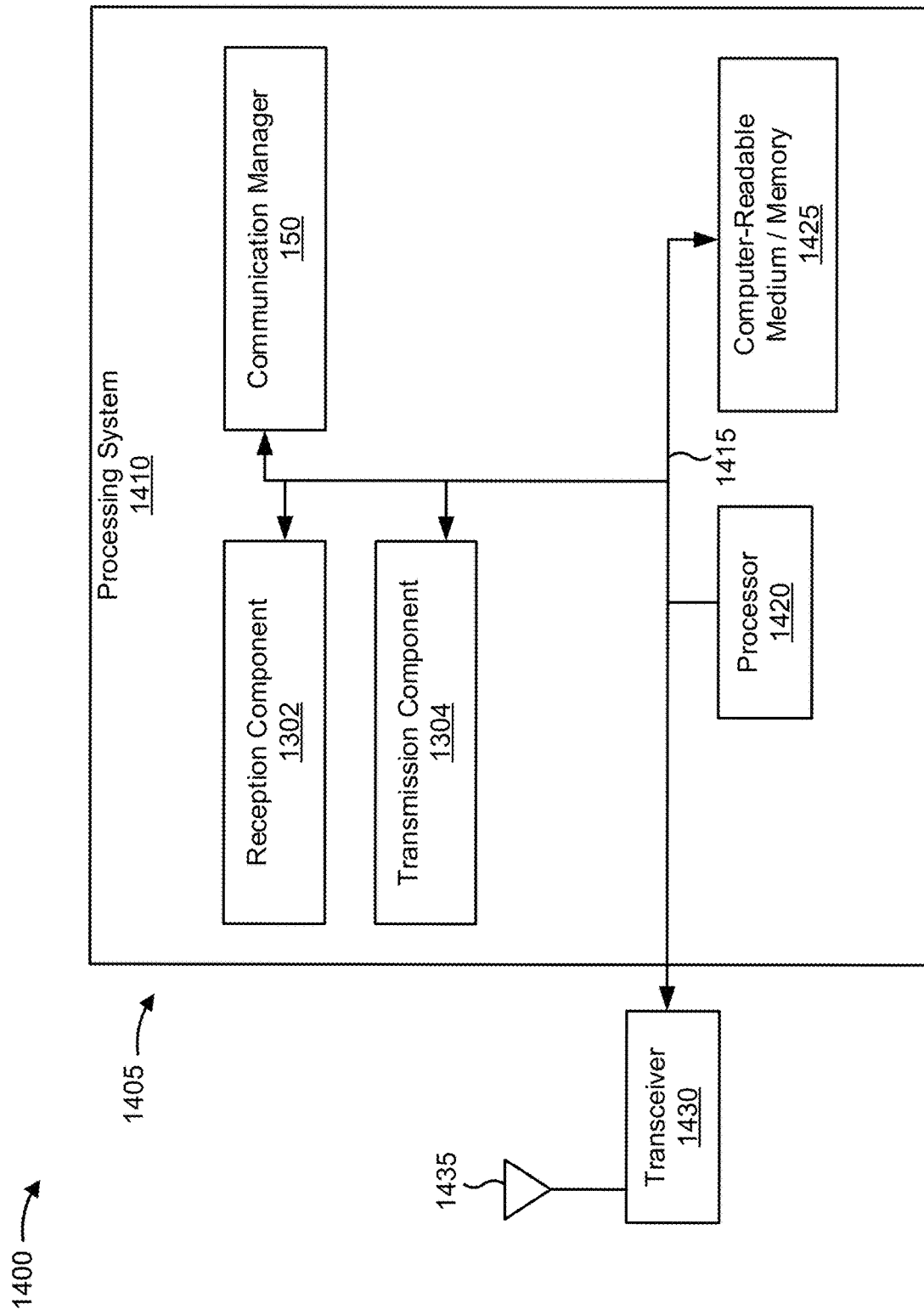
FIG. 14 is a diagram illustrating an example of a hardware implementation for an apparatus employing a processing system.

FIG. 14 is a diagram illustrating an example 1400 of a hardware implementation for an apparatus 1405 employing a processing system 1410. The apparatus 1405 may be a base station.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, and/or power management circuits.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 242 and/or at least one of the TX MIMO processor 230, the RX processor 238, and/or the controller/processor 240. In some aspects, the apparatus 1405 for wireless communication includes means for means for receiving, from a UE, a BFS report, the BFS report indicating a measure of similarity between a first condition of the UE and a second condition of the UE associated with a past beam failure event; and/or means for transmitting, to the UE, configuration information indicating one or more actions to be performed by the UE when a third condition of the UE is similar to the second condition. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

Figure 15:
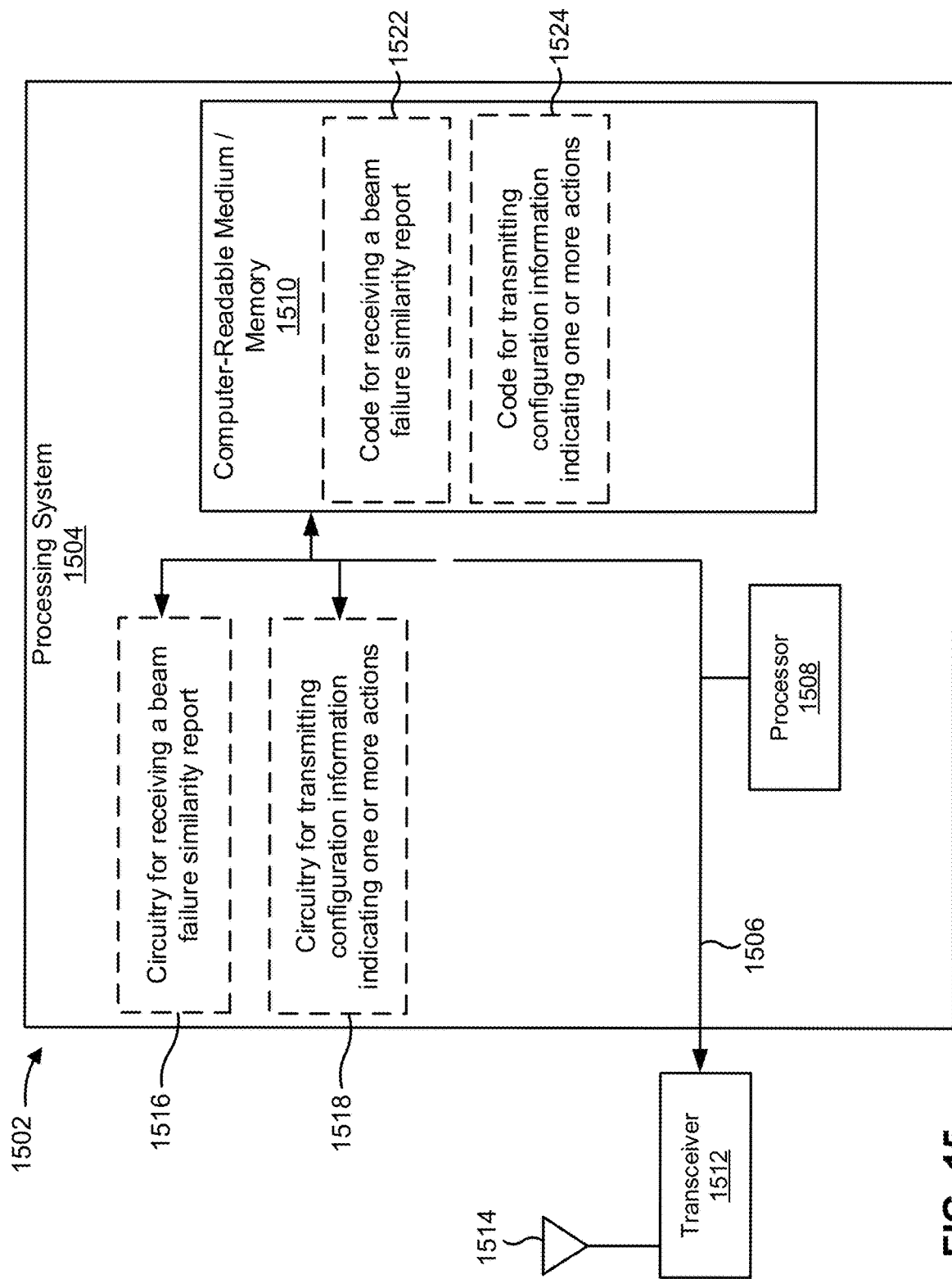
FIG. 15 is a diagram illustrating an example of an implementation of code and circuitry for an apparatus for wireless communication.

FIG. 15 is a diagram illustrating an example 1500 of an implementation of code and circuitry for an apparatus 1502 for wireless communication. The apparatus 1502 may be, be similar to, include, or be included in the apparatus 1300 shown in FIG. 13 and/or the apparatus 1402 shown in FIG. 14. For example, the apparatus 1502 may be, or include, a base station. The apparatus 1502 may include a processing system 1504, which may include a bus 1506 coupling one or more components such as, for example, a processor 1508, computer-readable medium/memory 1510, a transceiver 1512, and/or the like. As shown, the transceiver 1512 may be coupled to one or more antenna 1514.

As further shown in FIG. 15, the apparatus 1502 may include circuitry for receiving a beam failure similarity report (circuitry 1516). For example, the apparatus 1502 may include circuitry 1516 to enable the apparatus 1502 to receive, from a UE, a BFS report, the BFS report indicating a measure of similarity between a first condition of the UE and a second condition of the UE associated with a past beam failure event.

As further shown in FIG. 15, the apparatus 1502 may include circuitry for transmitting configuration information indicating one or more actions (circuitry 1518). For example, the apparatus 1502 may include circuitry 1518 to enable the apparatus 1502 to transmit, to the UE, configuration information indicating one or more actions to be performed by the UE when a third condition of the UE is similar to the second condition.

As further shown in FIG. 15, the apparatus 1502 may include, stored in computer-readable medium 1510, code for receiving a beam failure similarity report (code 1522). For example, the apparatus 1502 may include code 1522 that, when executed by the processor 1508, may cause the transceiver 1512 to receive, from a UE, a BFS report, the BFS report indicating a measure of similarity between a first condition of the UE and a second condition of the UE associated with a past beam failure event.

As further shown in FIG. 15, the apparatus 1502 may include, stored in computer-readable medium 1510, code for transmitting configuration information indicating one or more actions (code 1524). For example, the apparatus 1502 may include code 1524 that, when executed by the processor 1508, may cause the transceiver 1512 to transmit, to the UE, configuration information indicating one or more actions to be performed by the UE when a third condition of the UE is similar to the second condition.

FIG. 15 is provided as an example. Other examples may differ from what is described in connection with FIG. 15.

The following provides an overview of some Aspects of the present disclosure:

Aspect 1: A method of wireless communication performed by a user equipment (UE), comprising: detecting a beam failure event associated with the UE; detecting a first condition of the UE; and performing one or more actions associated with beam failure recovery based at least in part on a measure of similarity between the first condition of the UE and a second condition of the UE associated with a past beam failure event.

Aspect 2: The method of Aspect 1, wherein performing the one or more actions includes: continuing to use a current beam for communications with a base station, performing contention-free RACH with the base station, or performing contention-free RACH with a TRP separate from the base station.

Aspect 3: The method of any of Aspects 1 or 2, further comprising: determining the one or more actions based at least in part on one or more past actions performed by the UE in association with the past beam failure event.

Aspect 4: The method of any of Aspects 1-3, further comprising: obtaining information indicating that one or more past actions performed by the UE in association with the past beam failure event were successful; and determining the one or more actions based at least in part on the one or more past actions being identified as successful.

Aspect 5: The method of any of Aspects 1-4, wherein determining the one or more actions to perform comprises: obtaining information indicating that one or more past actions performed by the UE in association with the past beam failure event were unsuccessful; and determining the one or more actions based at least in part on the one or more past actions being unsuccessful.

Aspect 6: The method of any of Aspects 1-5, further comprising: receiving configuration information indicating, for each of a plurality of past beam failure events that includes the past beam failure event, one or more corresponding actions to be performed by the UE; and determining the one or more actions based at least in part on the one or more corresponding actions indicated for the past beam failure event.

Aspect 7: The method of Aspect 6, wherein the configuration information further indicates, for each of the plurality of past beam failure events, similarity criteria for performing the one or more corresponding actions; and determining the one or more actions further comprises: determining the one or more actions based at least in part on the first condition of the UE satisfying the similarity criteria.

Aspect 8: The method of Aspect 7, wherein the similarity criteria comprise a threshold measure of similarity between the first condition of the UE and the second condition of the UE.

Aspect 9: The method of any of Aspects 1-8, further comprising: receiving configuration information indicating one or more RACH resources associated with contention-free RACH with one or more TRPs; and wherein performing the one or more actions includes: performing the contention-free RACH with a TRP included in the one or more TRPs using the one or more RACH resources. wherein performing the one or more actions includes: performing the contention-free RACH with a TRP included in the one or more TRPs using the one or more RACH resources.

Aspect 10: The method of any of Aspects 1-9, further comprising: receiving configuration information indicating one or more RACH resources associated with contention-free RACH with a base station; and wherein performing the one or more actions includes: performing the contention-free RACH with the base station using the one or more RACH resources. wherein performing the one or more actions includes: performing the contention-free RACH with the base station using the one or more RACH resources.

Aspect 11: The method of any of Aspects 1-10, wherein the UE is a reduced capability UE.

Aspect 12: The method of any of Aspects 1-11, wherein the measure of similarity is indicated by four bits included in a beam failure similarity (BFS) report.

Aspect 13: A method of wireless communication performed by a base station, comprising: receiving, from a UE, a BFS report, the BFS report indicating a measure of similarity between a first condition of the UE and a second condition of the UE associated with a past beam failure event; and transmitting, to the UE, configuration information indicating one or more actions to be performed by the UE when a third condition of the UE is similar to the second condition.

Aspect 14: The method of Aspect 13, wherein the one or more actions include: continuing to use a current beam for communications with the base station, performing contention-free RACH with the base station, or performing contention-free RACH with a TRP separate from the base station.

Aspect 15: The method of any of Aspects 13 or 14, further comprising: determining the one or more actions based at least in part on one or more past actions performed by the UE in association with the past beam failure event.

Aspect 16: The method of any of Aspects 13-15, further comprising: obtaining information indicating that one or more past actions performed by the UE in association with the past beam failure event were successful; and determining the one or more actions based at least in part on the one or more past actions being successful.

Aspect 17: The method of any of Aspects 13-16, wherein determining the one or more actions to perform comprises: obtaining information indicating that one or more past actions performed by the UE in association with the past beam failure event were unsuccessful; and determining the one or more actions based at least in part on the one or more past actions being unsuccessful.

Aspect 18: The method of any of Aspects 13-17, wherein the configuration information further indicates, for each of one or more other past beam failure events associated with corresponding conditions of the UE, one or more corresponding actions to be performed by the UE based at least in part on the third condition of the UE being similar to one of the corresponding conditions of the UE.

Aspect 19: The method of any of Aspects 13-18, wherein the configuration information further indicates similarity criteria for performing the one or more actions.

Aspect 20: The method of Aspect 19, wherein the similarity criteria comprise a threshold measure of similarity between the first condition of the UE and the second condition of the UE.

Aspect 21: The method of any of Aspects 13-20, further comprising: transmitting other configuration information indicating one or more random access channel (RACH) resources associated with contention-free RACH with one or more transmit receive point (TRPs); and wherein the one or more actions include: performing the contention-free RACH with a TRP included in the one or more TRPs using the one or more RACH resources. wherein performing the one or more actions include: performing the contention-free RACH with a TRP included in the one or more TRPs using the one or more RACH resources.

Aspect 22: The method of any of Aspects 13-21, further comprising: transmitting other configuration information indicating one or more random access channel (RACH) resources associated with contention-free RACH with the base station; and wherein the one or more actions include: performing the contention-free RACH with the base station using the one or more RACH resources. wherein the one or more actions include: performing the contention-free RACH with the base station using the one or more RACH resources.

Aspect 23: The method of any of Aspects 13-22, wherein transmitting the configuration information comprises: transmitting the configuration information based at least in part on the UE being a reduced capability UE.

Aspect 24: An apparatus for wireless communication at a device, comprising a processor; memory coupled with the processor; and instructions stored in the memory and executable by the processor to cause the apparatus to perform the method of one or more of Aspects 1-12.

Aspect 25: An apparatus for wireless communication at a device, comprising a processor; memory coupled with the processor; and instructions stored in the memory and executable by the processor to cause the apparatus to perform the method of one or more of Aspects 13-23.

Aspect 26: A device for wireless communication, comprising a memory and one or more processors coupled to the memory, the one or more processors configured to perform the method of one or more of Aspects 1-12.

Aspect 27: A device for wireless communication, comprising a memory and one or more processors coupled to the memory, the one or more processors configured to perform the method of one or more of Aspects 13-23.

Aspect 28: An apparatus for wireless communication, comprising at least one means for performing the method of one or more of Aspects 1-12.

Aspect 29: An apparatus for wireless communication, comprising at least one means for performing the method of one or more of Aspects 13-23.

Aspect 30: A non-transitory computer-readable medium storing code for wireless communication, the code comprising instructions executable by a processor to perform the method of one or more of Aspects 1-12.

Aspect 31: A non-transitory computer-readable medium storing code for wireless communication, the code comprising instructions executable by a processor to perform the method of one or more of Aspects 13-23.

Aspect 32: A non-transitory computer-readable medium storing a set of instructions for wireless communication, the set of instructions comprising one or more instructions that, when executed by one or more processors of a device, cause the device to perform the method of one or more of Aspects 12-23.

Aspect 33: A non-transitory computer-readable medium storing a set of instructions for wireless communication, the set of instructions comprising one or more instructions that, when executed by one or more processors of a device, cause the device to perform the method of one or more of Aspects 13-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, andc+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device for wireless communication, comprising:
   a memory; and
   one or more processors coupled to the memory, the one or more processors configured to cause the device to:
   detect a beam failure event associated with the device;
   detect a first condition of the device;
   receive configuration information that indicates, for each of a plurality of past beam failure events that includes a past beam failure event, one or more corresponding actions to be performed by the device; and
   perform one or more actions associated with beam failure recovery based at least in part on a measure of similarity between the first condition of the device and a second condition of the device associated with the past beam failure event and the one or more corresponding actions indicated for the past beam failure event.

2. The device of claim 1, wherein the one or more processors, to perform the one or more actions, are configured to cause the device to:
   continue to use a current beam for communications with a network entity,
   perform contention-free random access channel (RACH) with the network entity, or
   perform contention-free RACH with a transmit receive point (TRP) separate from the network entity.

3. The device of claim 1, wherein the one or more processors are further configured to cause the device to:
   determine the one or more actions based at least in part on one or more past actions performed by the device in association with the past beam failure event.

4. The device of claim 1, wherein the one or more processors are further configured to cause the device to:
   obtain information that indicates one or more past actions performed by the device in association with the past beam failure event were successful; and
   determine the one or more actions based at least in part on the one or more past actions that were identified as successful.

5. The device of claim 1, wherein the one or more processors are further configured to cause the device to:
   obtain information that indicates one or more past actions performed by the device in association with the past beam failure event were unsuccessful; and
   determine the one or more actions based at least in part on the one or more past actions that were unsuccessful.

6. The device of claim 1, wherein the configuration information further indicates, for each of the plurality of past beam failure events, similarity criteria to perform the one or more corresponding actions; and
   wherein the one or more processors are further configured to cause the device to:
   determine the one or more actions based at least in part on the first condition of the device that satisfies the similarity criteria.

7. The device of claim 6, wherein the similarity criteria comprise a threshold measure of similarity between the first condition of the device and the second condition of the device.

8. The device of claim 1, wherein the one or more processors are further configured to cause the device to:
   receive other configuration information that indicates one or more random access channel (RACH) resources associated with contention-free RACH with one or more transmit receive points (TRPs); and
   wherein the one or more processors, to perform the one or more actions, are configured to cause the device to:
   perform the contention-free RACH with a TRP included in the one or more TRPs using the one or more RACH resources.

9. The device of claim 1, wherein the one or more processors are further configured to:
receive other configuration information that indicates one or more random access channel (RACH) resources associated with contention-free RACH with a network entity; and
wherein the one or more processors, to perform the one or more actions, are configured to cause the device to:
perform the contention-free RACH with the network entity using the one or more RACH resources.

10. The device of claim 1, wherein the device is a reduced capability UE.

11. The device of claim 1, wherein the measure of similarity is indicated by four bits included in a beam failure similarity (BFS) report.

12. A device for wireless communication, comprising:
a memory; and
one or more processors coupled to the memory, the one or more processors configured to cause the device to:
receive a beam failure similarity (BFS) report, wherein the BFS report indicates a measure of similarity between a first condition of the UE a user equipment (UE) and a second condition of the UE associated with a past beam failure event; and
transmit configuration information that indicates one or more actions to be performed by the UE based at least in part on a third condition of the UE that is similar to the second condition, wherein the configuration information further indicates, for each of one or more other past beam failure events associated with corresponding conditions of the UE, one or more corresponding actions to be performed by the UE based at least in part on the third condition of the UE that is similar to one of the corresponding conditions of the UE.

13. The device of claim 12, wherein the one or more actions include:
continue to use a current beam for communications with the device,
perform contention-free random access channel (RACH) with the device, or
perform contention-free RACH with a transmit receive point (TRP) separate from the device.

14. The device of claim 12, wherein the one or more processors are further configured to cause the device to:
determine the one or more actions based at least in part on one or more past actions performed by the UE in association with the past beam failure event.

15. The device of claim 12, wherein the one or more processors are further configured to cause the device to:
obtain information that indicates one or more past actions performed by the UE in association with the past beam failure event were successful; and
determine the one or more actions based at least in part on the one or more past actions that were successful.

16. The device of claim 12, wherein the one or more processors, to determine the one or more actions to be performed by the UE, are configured to cause the device to:
obtain information that indicates one or more past actions performed by the UE in association with the past beam failure event were unsuccessful; and
determine the one or more actions based at least in part on the one or more past actions that were unsuccessful.

17. The device of claim 12, wherein the configuration information further indicates similarity criteria to perform the one or more actions.

18. The device of claim 17, wherein the similarity criteria comprise a threshold measure of similarity between the first condition of the UE and the second condition of the UE.

19. The device of claim 12, wherein the one or more processors are further configured to cause the device to:
transmit other configuration information that indicates one or more random access channel (RACH) resources associated with contention-free RACH with one or more transmit receive point (TRPs); and
wherein the one or more actions include:
perform the contention-free RACH with a TRP included in the one or more TRPs using the one or more RACH resources.

20. The device of claim 12, wherein the one or more processors are further configured to cause the device to:
transmit other configuration information that indicates one or more random access channel (RACH) resources associated with contention-free RACH with the device; and
wherein the one or more actions include:
perform the contention-free RACH with the device using the one or more RACH resources.

21. The device of claim 12, wherein the one or more processors, to transmit the configuration information, are configured to cause the device to:
transmit the configuration information based at least in part on the UE being a reduced capability UE.

22. A method of wireless communication performed at a user equipment (UE), comprising:
detecting a beam failure event associated with the UE;
detecting a first condition of the UE;
receiving configuration information indicating, for each of a plurality of past beam failure events that includes a past beam failure event, one or more corresponding actions to be performed by the UE; and
performing one or more actions associated with beam failure recovery based at least in part on a measure of similarity between the first condition of the UE and a second condition of the UE associated with the past beam failure event and the one or more corresponding actions indicated for the past beam failure event.

23. The method of claim 22, wherein performing the one or more actions includes:
continuing to use a current beam for communications with a network entity,
performing contention-free random access channel (RACH) with the network entity, or
performing contention-free RACH with a transmit receive point (TRP) separate from the network entity.

24. The method of claim 22, further comprising:
determining the one or more actions based at least in part on one or more past actions performed by the UE in association with the past beam failure event.

25. A method of wireless communication performed at a network entity, comprising:
receiving a beam failure similarity (BFS) report, the BFS report indicating a measure of similarity between a first condition of a user equipment (UE) and a second condition of the UE associated with a past beam failure event; and
transmitting configuration information indicating one or more actions to be performed by the UE based at least in part on a third condition of the UE being similar to the second condition, the configuration information further indicating, for each of one or more other past beam failure events associated with corresponding conditions of the UE, one or more corresponding actions to be performed by the UE based at least in part on the third condition of the UE being similar to one of the corresponding conditions of the UE.

26. The method of claim 25, wherein the one or more actions include:
    continuing to use a current beam for communications with the network entity,
    performing contention-free random access channel (RACH) with the network entity, or
    performing contention-free RACH with a transmit receive point (TRP) separate from the network entity.

27. The method of claim 25, further comprising:
    determining the one or more actions based at least in part on one or more past actions performed by the UE in association with the past beam failure event.

28. A non-transitory computer-readable medium storing a set of instructions for wireless communication, the set of instructions comprising:
    one or more instructions that, when executed by one or more processors of a user equipment (UE), cause the UE to:
        detect a beam failure event associated with the UE;
        detect a first condition of the UE;
        receive configuration information indicating, for each of a plurality of past beam failure events that includes a past beam failure event, one or more corresponding actions to be performed by the UE; and
        perform one or more actions associated with beam failure recovery based at least in part on a measure of similarity between the first condition of the UE and a second condition of the UE associated with the past beam failure event and the one or more corresponding actions indicated for the past beam failure event.

29. The non-transitory computer-readable medium of claim 28, wherein the one or more instructions that, when executed by the one or more processors of the UE, cause the UE to perform the one or more actions further comprise one or more instructions that, when executed by the one or more processors of the UE, cause the UE to:
    continue to use a current beam for communications with a network entity,
    perform contention-free random access channel (RACH) with the network entity, or
    perform contention-free RACH with a transmit receive point (TRP) separate from the network entity.

30. A non-transitory computer-readable medium storing a set of instructions for wireless communication, the set of instructions comprising:
    one or more instructions that, when executed by one or more processors of a network entity, cause the network entity to:
        receive a beam failure similarity (BFS) report, the BFS report indicating a measure of similarity between a first condition of a user equipment (UE) and a second condition of the UE associated with a past beam failure event; and
        transmit configuration information indicating one or more actions to be performed by the UE based at least in part on a third condition of the UE being similar to the second condition, the configuration information further indicating, for each of one or more other past beam failure events associated with corresponding conditions of the UE, one or more corresponding actions to be performed by the UE based at least in part on the third condition of the UE being similar to one of the corresponding conditions of the UE.

31. The non-transitory computer-readable medium of claim 30, wherein the one or more actions include:
    continue to use a current beam for communications with the network entity,
    perform contention-free random access channel (RACH) with network entity, or
    perform contention-free RACH with a transmit receive point (TRP) separate from the network entity.

* * * * *